(12) United States Patent
Kimura et al.

(10) Patent No.: US 10,793,658 B2
(45) Date of Patent: *Oct. 6, 2020

(54) MULTI-COMPONENT COPOLYMER, RUBBER COMPOSITION, CROSSLINKED RUBBER COMPOSITION, RUBBER PRODUCT, AND TIRE

(71) Applicant: BRIDGESTONE CORPORATION, Tokyo (JP)

(72) Inventors: Madoka Kimura, Chuo-ku (JP); Aya Yanagisawa, Chuo-ku (JP); Shigeki Oishi, Chuo-ku (JP); Shojiro Kaita, Chuo-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/766,543

(22) PCT Filed: Oct. 14, 2016

(86) PCT No.: PCT/JP2016/080616
§ 371 (c)(1),
(2) Date: Apr. 6, 2018

(87) PCT Pub. No.: WO2017/065301
PCT Pub. Date: Apr. 20, 2017

(65) Prior Publication Data
US 2018/0298135 A1    Oct. 18, 2018

(30) Foreign Application Priority Data

Oct. 16, 2015 (JP) .................. 2015-204478

(51) Int. Cl.
| | |
|---|---|
| C08F 236/10 | (2006.01) |
| C08K 5/00 | (2006.01) |
| C08L 25/02 | (2006.01) |
| C08F 212/06 | (2006.01) |
| C08K 3/011 | (2018.01) |
| C08L 23/00 | (2006.01) |
| C08L 9/00 | (2006.01) |
| B60C 1/00 | (2006.01) |
| C08L 47/00 | (2006.01) |
| C08K 5/36 | (2006.01) |
| C08F 210/00 | (2006.01) |
| C08F 8/36 | (2006.01) |

(52) U.S. Cl.
CPC .............. *C08F 236/10* (2013.01); *B60C 1/00* (2013.01); *B60C 1/0025* (2013.01); *C08F 8/36* (2013.01); *C08F 210/00* (2013.01); *C08F 212/06* (2013.01); *C08K 3/011* (2018.01); *C08K 5/0025* (2013.01); *C08K 5/36* (2013.01); *C08L 9/00* (2013.01); *C08L 23/00* (2013.01); *C08L 25/02* (2013.01); *C08L 47/00* (2013.01)

(58) Field of Classification Search
CPC .... C08F 236/10; C08F 212/06; C08F 210/00; C08F 8/36; C08K 5/0025; C08K 3/011; C08K 5/36; C08L 25/02; C08L 23/00; C08L 9/00; C08L 47/00; B60C 1/00; B60C 1/0025
USPC ........................................................ 525/332.5
See application file for complete search history.

(56) References Cited

U.S. PATENT DOCUMENTS

| | | | |
|---|---|---|---|
| 6,310,164 B1 * | 10/2001 | Morizono ............. | C08F 210/18 526/339 |
| 6,706,830 B2 * | 3/2004 | Windisch ............. | C08F 236/04 526/129 |
| 8,962,743 B2 | 2/2015 | Kaita et al. | |
| 10,030,092 B2 * | 7/2018 | Oishi .................... | C08F 210/02 |
| 2003/0162920 A1 | 8/2003 | Windisch et al. | |
| 2005/0119399 A1 | 6/2005 | Nishioka et al. | |
| 2007/0232758 A1 | 10/2007 | Hou et al. | |
| 2009/0264604 A1 | 10/2009 | Kaita et al. | |

(Continued)

FOREIGN PATENT DOCUMENTS

| | | |
|---|---|---|
| CN | 103154058 A | 6/2013 |
| JP | 08-244179 A | 9/1996 |
| JP | 09-291121 A | 11/1997 |
| JP | 11-035744 A | 2/1999 |
| JP | 11-035810 A | 2/1999 |
| JP | 11-080269 A | 3/1999 |
| JP | 2005-220313 A | 8/2005 |

(Continued)

OTHER PUBLICATIONS

Extended European Search Report dated Jul. 25, 2018 issued by the European Patent Office in counterpart application No. 16855554.8.

(Continued)

*Primary Examiner* — Michael Bernshteyn
(74) *Attorney, Agent, or Firm* — Sughrue Mion, PLLC

(57) ABSTRACT

An object of the present invention is to provide a multicomponent copolymer for use for producing a rubber composition and a rubber product such as tires and the like excellent in crack resistance and further having low heat generation while maintaining high weather resistance. Further, the present invention is to provide a rubber composition containing the multicomponent copolymer, a crosslinked rubber composition obtained by crosslinking the rubber composition, and a rubber product and a tire using the rubber composition or the crosslinked rubber composition. The multicomponent copolymer of the present invention contains a conjugated diene unit, a non-conjugated olefin unit and an aromatic vinyl unit, wherein the main chain is formed of an acyclic structure alone and the content of the aromatic vinyl unit is 5 mol % or less of the whole multicomponent copolymer.

16 Claims, 2 Drawing Sheets

(56) References Cited

U.S. PATENT DOCUMENTS

| | | |
|---|---|---|
| 2013/0197157 A1 | 8/2013 | Kaita et al. |
| 2013/0210994 A1 | 8/2013 | Kaita et al. |
| 2014/0018493 A1* | 1/2014 | Horikawa ................. B60C 1/00 524/574 |
| 2017/0137552 A1* | 5/2017 | Oishi .................... C08F 210/02 |

FOREIGN PATENT DOCUMENTS

| | | |
|---|---|---|
| WO | 2006/004068 A1 | 1/2006 |
| WO | 2007/129670 A1 | 11/2007 |
| WO | 2012/014455 A1 | 2/2012 |
| WO | WO 2015/190072 A1 * | 12/2012 |
| WO | 2015/190072 A1 | 12/2015 |
| WO | 2015/190073 A1 | 12/2015 |
| WO | WO-2015190072 A1 * | 12/2015 ............ B60C 1/0016 |

OTHER PUBLICATIONS

International Search Report for PCT/JP2016/080616 dated Dec. 20, 2016.

\* cited by examiner

[Fig. 1]
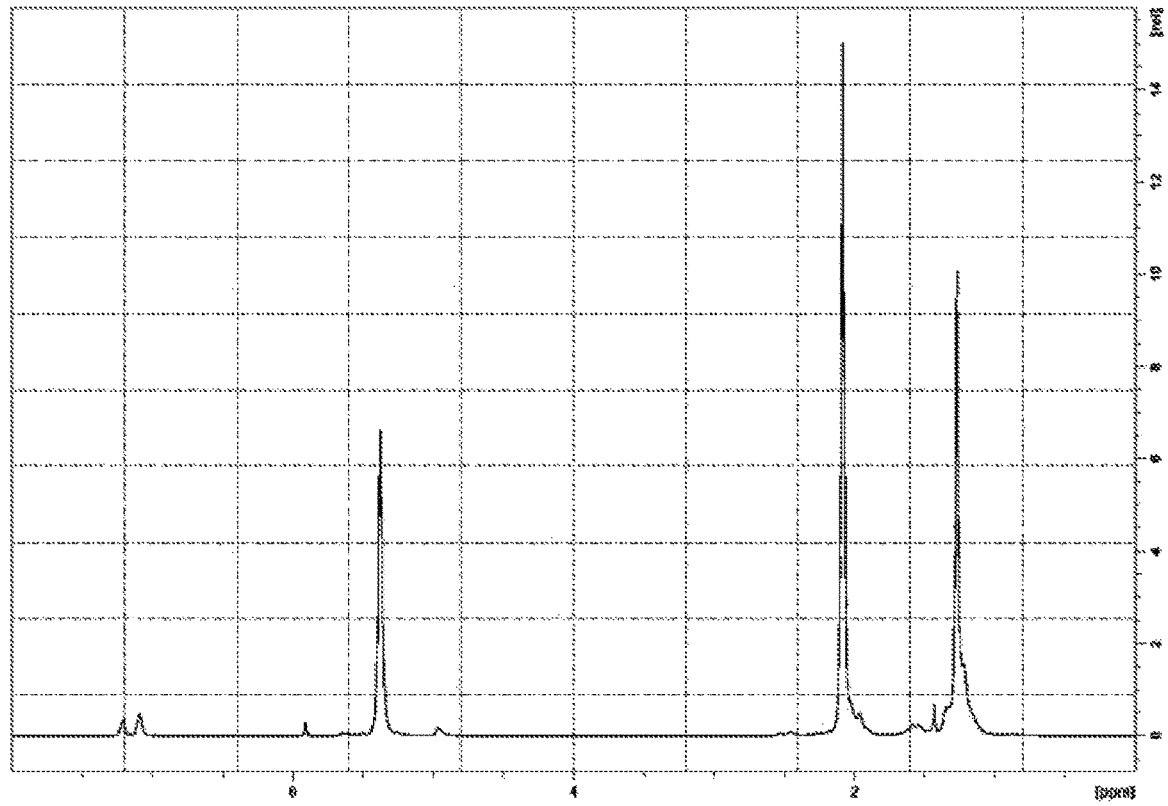
[Fig. 2]
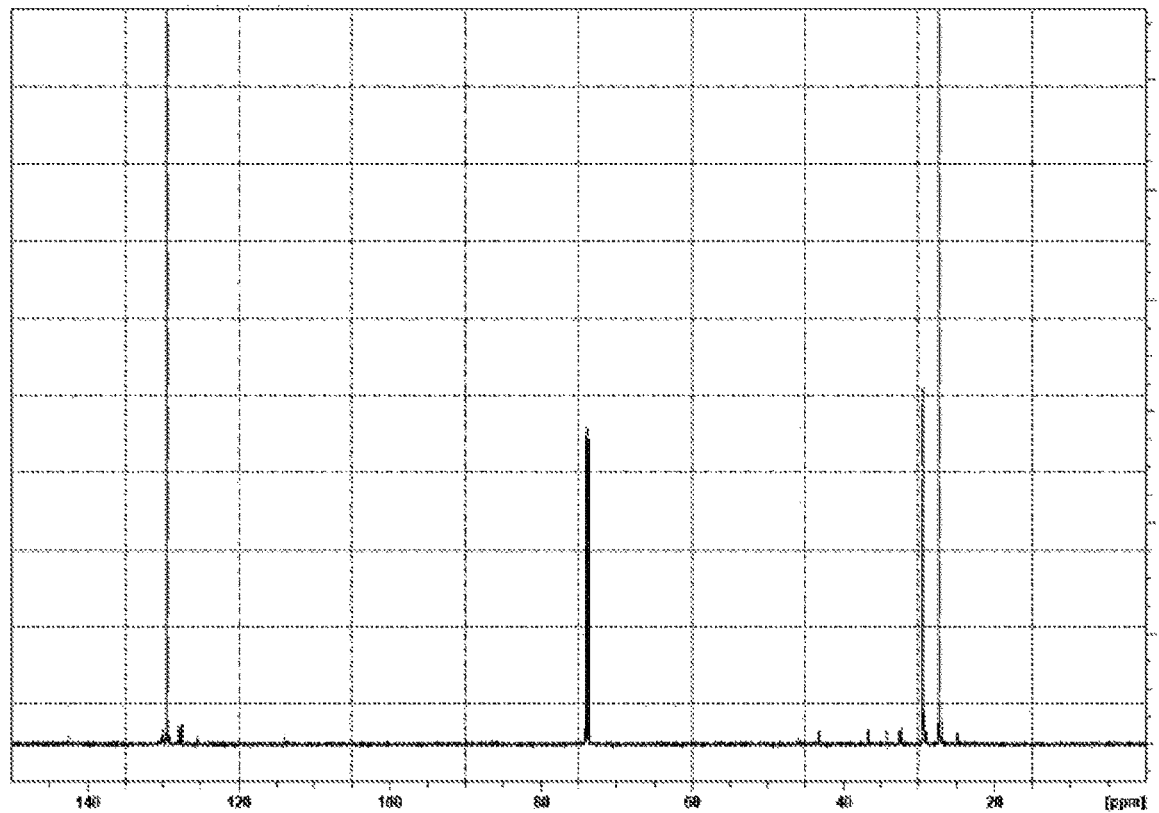

[Fig. 3]
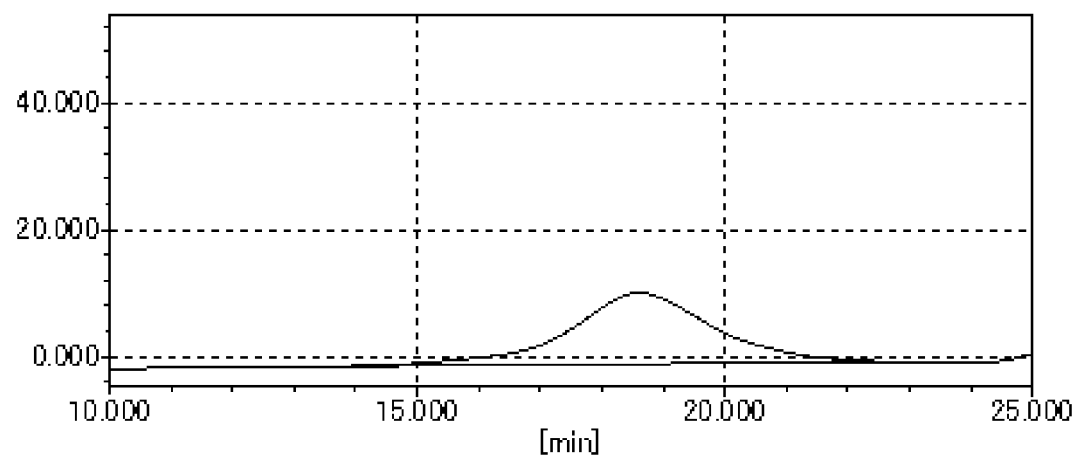
[Fig. 4]
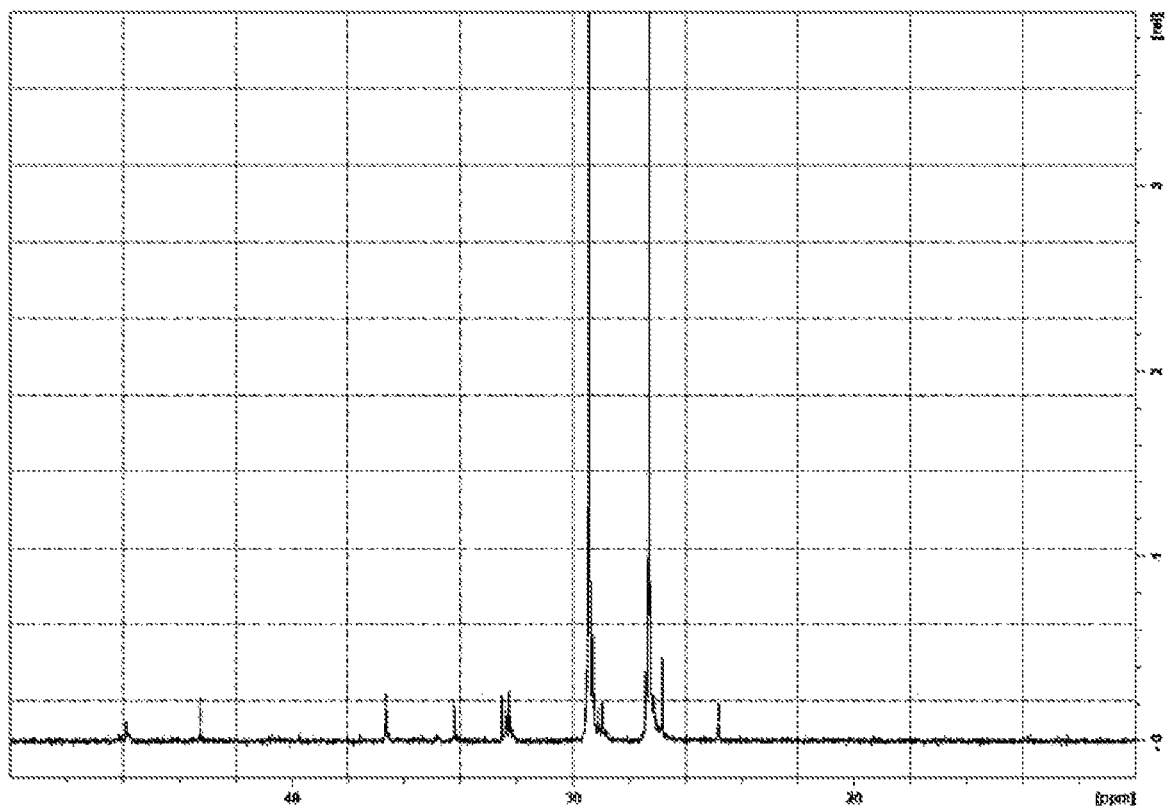

MULTI-COMPONENT COPOLYMER, RUBBER COMPOSITION, CROSSLINKED RUBBER COMPOSITION, RUBBER PRODUCT, AND TIRE

CROSS REFERENCE TO RELATED APPLICATIONS

This application is a National Stage of International Application No. PCT/JP2016/080616 filed Oct. 14, 2016, claiming priority based on Japanese Patent Application No. 2015-204478 filed Oct. 16, 2015.

TECHNICAL FIELD

The present invention relates to a multicomponent copolymer, a rubber composition, a crosslinked rubber composition, a rubber product and a tire.

BACKGROUND ART

In general, rubber products (tires, conveyor belts, vibration-proof rubbers, seismic isolation rubbers, etc.) are required to have high durability and weather resistance, and for satisfying these requirements, various rubber components and rubber compositions have been developed.

For example, PTL 1 discloses a copolymer of a conjugated diene compound and a non-conjugated olefin, in which the cis-1,4-bond content of the conjugated diene moiety (conjugated diene compound-derived moiety) is more than 70.5 mol % and the content of the non-conjugated olefin is 10 mol % or more, and the copolymer is used for producing a rubber having excellent crack resistance and weather resistance.

CITATION LIST

Patent Literature

PTL 1: WO2012/014455A1

SUMMARY OF INVENTION

Technical Problem

An object of the present invention is to provide a multicomponent copolymer that is used for producing a crosslinked rubber composition and a rubber product such as tires and the like excellent in crack resistance and having low heat generation while maintaining high weather resistance. Further, the present invention is to provide a rubber composition containing the multicomponent copolymer, a crosslinked rubber composition obtained by crosslinking the rubber composition, and a rubber product and a tire using the rubber composition or the crosslinked rubber composition.

Solution to Problem

The present inventors have assiduously studied and, as a result, have found that, by using a multicomponent copolymer which contains a conjugated diene unit, a non-conjugated olefin unit and an aromatic vinyl unit and in which the main chain is formed of an acyclic structure alone and the content of the aromatic vinyl unit relative to the whole multicomponent copolymer is defined to fall within a specific range, the above-mentioned problem can be solved.

Specifically, the present invention relates to the following <1> to <14>.

<1> A multicomponent copolymer containing a conjugated diene unit, a non-conjugated olefin unit and an aromatic vinyl unit, wherein the main chain is formed of an acyclic structure alone, and the content of the aromatic vinyl unit is 5 mol % or less of the whole multicomponent copolymer.
<2> The multicomponent copolymer according to <1>, wherein the cis-1,4-bond content in the whole conjugated diene unit is 50% or more.
<3> The multicomponent copolymer according to <1> or <2>, wherein the content of the non-conjugated olefin unit is 50 mol % or less of the whole multicomponent copolymer.
<4> The multicomponent copolymer according to any one of <1> to <3>, wherein the content of the conjugated diene unit is 45 mol % or more of the whole multicomponent copolymer.
<5> The multicomponent copolymer according to any one of <1> to <4>, wherein the content of the conjugated diene unit is 80 mol % or less of the whole multicomponent copolymer.
<6> The multicomponent copolymer according to any one of <1> to <5>, whose highest melting point among the melting points of the multicomponent copolymer is 100° C. or higher.
<7> The multicomponent copolymer according to any one of <1> to <6>, wherein the non-conjugated olefin unit is an ethylene unit alone.
<8> The multicomponent copolymer according to any one of <1> to <7>, wherein the aromatic vinyl unit contains a styrene unit.
<9> The multicomponent copolymer according to any one of <1> to <8>, wherein the conjugated diene unit contains at least one selected from the group consisting of a 1,3-butadiene unit and an isoprene unit.
<10> The multicomponent copolymer according to any one of <1> to <9>, which is a tercopolymer composed of only a 1,3-butadiene unit, an ethylene unit and a styrene unit.
<11> A rubber composition containing the multicomponent copolymer of any one of <1> to <10>.
<12> A crosslinked rubber composition produced by crosslinking the rubber composition of <11>.
<13> A rubber product using the rubber composition of <11> or the crosslinked rubber composition of <12>.
<14> A tire using the rubber composition of <11> or the crosslinked rubber composition of <12>.

Advantageous Effects of Invention

According to the present invention, there can be provided a multicomponent copolymer that is used for producing a crosslinked rubber composition and a rubber product such as tires and the like excellent in crack resistance and having low heat generation while maintaining high weather resistance. Further, according to the present invention, there can be provided a rubber composition containing the multicomponent copolymer, a crosslinked rubber composition obtained by crosslinking the rubber composition, and a rubber product and a tire using the rubber composition or the crosslinked rubber composition.

BRIEF DESCRIPTION OF DRAWINGS

FIG. 1 a graph showing a $^1$H-NMR spectrum chart of the copolymer E in Examples.
FIG. 2 is a graph showing a $^{13}$C-NMR spectrum chart of the copolymer E in Examples.

FIG. 3 is a graph showing a GPC-RI curve of the copolymer E in Examples.

FIG. 4 is a graph showing a $^{13}$C-NMR spectrum chart (10 ppm to 50 ppm) of the copolymer E in Examples.

DESCRIPTION OF EMBODIMENTS

Hereinunder, the present invention is described in detail with reference to embodiments thereof. In the following description, the expression of "A to B" to indicate a numerical range represents the numerical range including the end points A and B, and represents "A or more and B or less" (in the case of A<B) or "A or less and B or more" in the case of A>B).

Part by mass and % by mass are the same as part by weight and % by weight, respectively.

(Multicomponent Copolymer)

The multicomponent copolymer of the present invention contains a conjugated diene unit, a non-conjugated olefin unit and an aromatic vinyl unit, wherein the main chain is formed of an acyclic structure alone, and the content of the aromatic vinyl unit is 5 mol % or less of the whole multicomponent copolymer.

Here in this description, "conjugated diene unit" means a unit corresponding to the structural unit derived from a conjugated diene compound in the multicomponent copolymer, "non-conjugated olefin unit" means a unit corresponding to the structural unit derived from a non-conjugated olefin component in the multicomponent copolymer, and "aromatic vinyl unit" means a unit corresponding to the structural unit derived from an aromatic vinyl compound in the multicomponent copolymer.

Also in this description, "conjugated diene compound" means a diene compound of a conjugated system, "non-conjugated olefin compound" means an aliphatic unsaturated hydrocarbon, a compound of a non-conjugated system having one or more carbon-carbon double bonds, and "aromatic vinyl compound" means an aromatic compound substituted with at least a vinyl group and is not included in a conjugated diene compound.

Further in this description, "main chain" indicates a long-chain moiety to bond the bonding terminals of each unit in the multicomponent copolymer, and may be linear or branched, depending on the chain structure of the multicomponent copolymer. Specifically, "main chain" does not include a branched moiety not bonding to the neighboring unit, in each unit that constitutes the multicomponent copolymer.

With that, in this description, "multicomponent copolymer" means a copolymer produced by polymerizing three kinds or more monomers.

It is considered that, in the copolymer of butadiene and ethylene as described in PTL 1, ethylene microcrystals may be formed in the matrix to act as a reinforcing layer. However, too much increase in ethylene crystals, if any, would cause stress concentration in the matrix to worsen crack resistance and weather resistance.

The present inventors have assiduously studied and, as a result, have found that, by introducing a small amount of an aromatic vinyl compound as a third component, the copolymer can satisfy crack resistance, weather resistance and low heat generation, and have completed the present invention.

Though not clear, the mechanism of attaining the above-mentioned effect may be partly presumed to be as follows.

In the present invention, a small amount of an aromatic vinyl compound is introduced as a third component to shorten the chain length of the non-conjugated olefin unit such as ethylene, etc., and owing to the high steric hindrance that the aromatic vinyl compound has, crystal formation by the non-conjugated olefin unit could be efficiently suppressed to prevent stress concentration in the matrix, and accordingly crack resistance and weather resistance could be thereby enhanced. In addition, by introducing the non-conjugated olefin into the polymer, the amount of the ethylenic unsaturated bond in the multicomponent copolymer is lowered to provide excellent weather resistance.

In addition, it is presumed that, since the part formed of the non-conjugated olefin unit is introduced into the terminal of the polymer chain formed of the conjugated diene unit, the mobility of the polymer chain formed of the non-conjugated olefin unit would be thereby lowered to exhibit low heat generation.

<Conjugated Diene Unit>

The multicomponent copolymer of the present invention contains a conjugated diene unit. The conjugated diene unit is a structural unit derived from a conjugated diene compound as a monomer. The multicomponent copolymer of the present invention is produced through polymerization using a conjugated diene compound as a monomer, and is therefore excellent in crosslinking properties, as compared with a copolymer produced through polymerization using a non-conjugated diene compound such as, for example, a known ethylene-propylene-non-conjugated diene rubber (EPDM). Accordingly, the multicomponent copolymer of the present invention has an advantage of more enhancing the mechanical properties of rubber compositions and rubber products produced using it.

The conjugated diene compound preferably has 4 to 8 carbon atoms. Specifically, the conjugated diene compound includes 1,3-butadiene, isoprene, 1,3-pentadiene, 2,3-dimethyl-1,3-butadiene, etc.

From the viewpoint that the conjugated diene compound as a monomer for the multicomponent copolymer of the present invention can effectively improve the fracture performance at high temperatures of the rubber composition and the rubber product such as tires or the like using the resultant multicomponent copolymer, the conjugated diene compound preferably contains at least one selected from the group consisting of 1,3-butadiene and isoprene, and is more preferably formed of at least one monomer alone selected from the group consisting of 1,3-butadiene and isoprene, even more preferably 1,3-butadiene alone. In other words, the conjugated diene unit in the multicomponent copolymer of the present invention preferably contains at least one structural unit selected from the group consisting of a 1,3-butadiene unit and an isoprene unit, but is more preferably composed of at least one structural unit alone selected from a 1,3-butadiene unit and an isoprene unit, even more preferably a 1,3-butadiene unit alone.

Preferably, in the multicomponent copolymer of the present invention, the cis-1,4-bond content in the whole conjugated diene unit is 50% or more. When the cis-1,4-bond content in the whole conjugated diene unit is 50% or more, the glass transition temperature can be low so that the heat generation by the rubber composition or the rubber product such as tires and the like using the resultant multicomponent copolymer can be effectively lowered. From the same viewpoint, in the multicomponent copolymer of the present invention, the cis-1,4-bond content in the whole conjugated diene unit is preferably 70% or more, more preferably 80% or more, even more preferably 90% or more. The multicomponent copolymer of the type where the cis-1,4-bond content in the whole conjugated diene unit is high can be obtained, using a conjugated diene compound, a non-conjugated olefin compound and an aromatic vinyl compound as monomers.

On the other hand, the content of the vinyl bond (1,2-vinyl bond, 3,4-vinyl bond, etc.) in the whole conjugated diene unit is preferably 30% or less, more preferably 15% or less, even more preferably 10% or less, and especially preferably 6% or less. Also, the trans-1,4-bond content in the whole conjugated diene unit is preferably 30% or less, more preferably 15% or less, even more preferably 10% or less.

The content of cis-1,4-bond, trans-1,4-bond and vinyl bond can be determined as an integral ratio from the measurement results of $^1$H-NMR and $^{13}$C-NMR.

One alone or two or more kinds of the above-mentioned conjugated diene compounds may be used either singly or as combined. Specifically, the multicomponent copolymer of the present invention may contain one alone or two or more kinds of conjugated diene units.

The content of the conjugated diene unit is preferably 45 mol % or more of the whole multicomponent copolymer. The unit is more preferably 50 mol % or more, even more preferably 60 mol % or more. Also preferably, the content of the conjugated diene unit is preferably 90 mol % or less of the whole multicomponent copolymer, more preferably 85 mol % or less, even more preferably 80 mol % or less.

The content of the conjugated diene unit of 45 mol % or more of the whole multicomponent copolymer is preferred since a rubber composition and a rubber product excellent in elongation can be obtained. On the other hand, when the content is 90 mol % or less, weather resistance is excellent.

<Non-Conjugated Olefin Unit>

The multicomponent copolymer of the present invention contains a non-conjugated olefin unit. The non-conjugated olefin unit is a structural unit derived from a non-conjugated olefin compound as a monomer. The non-conjugated olefin compound preferably has 2 to 10 carbon atoms. Specifically, the non-conjugated olefin compound includes α-olefins such as ethylene, propylene, 1-butene, 1-pentene, 1-hexene, 1-heptene, 1-octene, etc.; and hetero atom-substituted alkene compounds such as vinyl pivalate, 1-phenylthioethene, N-vinylpyrrolidone, etc.

The non-conjugated olefin compound as a monomer for the multicomponent copolymer of the present invention is, from the viewpoint of more reducing the crystallinity of the resultant multicomponent copolymer and more improving the weather resistance of the rubber composition, tire and others using the multicomponent copolymer, preferably an acyclic non-conjugated olefin compound, and the acyclic non-conjugated olefin compound is preferably an α-olefin, even more preferably an α-olefin including ethylene, and is especially preferably composed of ethylene alone. In other words, the non-conjugated olefin unit in the multicomponent copolymer of the present invention is preferably an acyclic non-conjugated olefin unit, and the acyclic non-conjugated olefin unit is more preferably an α-olefin unit, even more preferably an α-olefin unit containing an ethylene unit, and is especially preferably composed of an ethylene unit alone.

One alone or two or more kinds of the above-mentioned conjugated olefin compounds may be used either singly or as combined. Specifically, the multicomponent copolymer of the present invention may contain one alone or two or more kinds of non-conjugated olefin units.

The content of the non-conjugated olefin unit is preferably 5 mol % or more of the whole multicomponent copolymer. The content is more preferably 10 mol % or more, even more preferably 20 mol % or more, especially preferably 30 mol % or more. Also preferably the content of the non-conjugated olefin unit is 70 mol % or less, more preferably 60 mol % or less, even more preferably 50 mol % or less of the whole multicomponent copolymer. The content of the non-conjugated olefin unit of 5 mol % or more is preferred as securing excellent ozone resistance. The content of 70 mol % or less is also preferred as securing excellent low heat generation.

<Aromatic Vinyl Unit>

The multicomponent copolymer of the present invention contains an aromatic vinyl unit. The aromatic vinyl unit is a structural unit derived from an aromatic vinyl compound as a monomer. Preferably, the aromatic vinyl compound has a vinyl group directly bonding to the aromatic ring and has 8 to 10 carbon atoms. Specifically, the aromatic vinyl compound includes styrene, o-methylstyrene, m-methylstyrene, p-methylstyrene, o,p-dimethylstyrene, o-ethylstyrene, m-ethylstyrene, p-ethylstyrene, etc.

The aromatic vinyl compound as a monomer for the multicomponent copolymer of the present invention preferably contains styrene from the viewpoint of more reducing the crystallinity of the resultant multicomponent copolymer and for more improving the weather resistance of the rubber composition, the tire and the like using the multicomponent copolymer, and is more preferably composed of styrene alone. In other words, the aromatic vinyl unit in the multicomponent copolymer of the present invention preferably contains a styrene unit, and is more preferably composed of a styrene unit alone.

The aromatic ring in the aromatic vinyl unit is not included in the main chain of the copolymer so far as it does not bond to the neighboring unit.

One alone or two or more kinds of the aromatic vinyl compounds may be used either singly or as combined. Specifically, the multicomponent copolymer of the present invention may contain one alone or two or more kinds of aromatic vinyl units either singly or as combined.

The content of the aromatic vinyl unit is 5 mol % or less of the whole multicomponent copolymer. When the content of the aromatic vinyl unit is more than 5 mol %, the glass transition temperature is high and the copolymer is poor in low heat generation. The content of the aromatic vinyl unit is preferably 4.5 mol % or less of the whole multicomponent copolymer, more preferably 4 mol % or less, even more preferably less than 3 mol %. Also preferably, the content of the aromatic vinyl unit is 0.1 mol % or more of the whole multicomponent copolymer, more preferably 0.5 mol % or more, even more preferably 1 mol % or more.

The number of the kinds of the monomers for the multicomponent copolymer of the present invention is not specifically limited so far as the multicomponent copolymer contains a conjugated diene unit, a non-conjugated olefin unit and an aromatic vinyl unit. The multicomponent copolymer of the present invention may contain any other structural unit than a conjugated diene unit, a non-conjugated olefin unit and an aromatic vinyl unit. The content of the other structural unit is, from the viewpoint of attaining the desired effects, preferably 30 mol % or less of the whole multicomponent copolymer, more preferably 20 mol % or less, even more preferably 10 mol % or less, and especially preferably, the copolymer does not contain any other structural unit, that is, the content of the other structural unit in the copolymer is especially preferably 0%.

The multicomponent copolymer of the present invention is a multicomponent copolymer at least containing one conjugated diene unit, one non-conjugated olefin unit and one aromatic vinyl unit. From the viewpoint of attaining favorable fracture resistance at high temperatures and favorable weather resistance, the multicomponent copolymer of the present invention preferably a polymer produced through polymerization at least using, as monomers, one conjugated diene compound, one non-conjugated olefin compound and one aromatic vinyl compound.

The multicomponent copolymer of the present invention is more preferably a tercopolymer composed of only one kind of conjugated diene unit, one kind of non-conjugated olefin unit and one kind of aromatic vinyl unit, and is even more preferably a tercopolymer composed of only a 1,3-butadiene unit, an ethylene unit and a styrene unit. Here, "one kind of conjugated diene unit" shall include conjugated diene units of different bonding modes.

The multicomponent copolymer of the present invention contains a conjugated diene unit, a non-conjugated olefin unit and an aromatic vinyl unit, and one significant characteristic feature thereof is that the main chain of the copolymer is formed of an acyclic structure alone. When the main chain has a cyclic structure, the polymer is hard, and the cyclic structure may have some negative influence on the ozone resistance of the copolymer. For confirming whether the main chain of the multicomponent copolymer has a cyclic structure or not, NMR may be employed as a main measuring means. Specifically, in the case where peaks derived from the cyclic structure existing in the main chain (for example, peaks appearing at 10 to 24 ppm for three-membered to five-membered rings) are not detected, it indicates that the main chain of the multicomponent polymer is composed of an acyclic structure alone.

Further, the multicomponent copolymer of the present invention can be produced through synthesis in one reactor, that is, through one-pot synthesis, and can be produced in a simplified process. A production method for the copolymer will be described hereinunder.

Preferably, the multicomponent copolymer of the present invention is such that the highest melting point ($T_m$) thereof is 100° C. or higher, more preferably 105° C. or higher, even more preferably 110° C. or higher. The upper limit of the melting point ($T_m$) is not specifically limited, but from the viewpoint of synthesis and handleability after synthesis, the highest melting point is preferably 130° C. or lower, more preferably 125° C. or lower, even more preferably 120° C. or lower. Namely, in such a case, the rubber composition, tire and others using the multicomponent copolymer can be produced with high workability and, in addition, in the temperature range where they are used, the rubber composition, tire and others can satisfy good crack resistance, weather resistance and low heat generation.

In the present invention, the melting point means a melting peak temperature measured using a differential scanning calorimeter (DSC) according to JIS K 7121-1987.

The multicomponent copolymer having a high melting point means that the copolymer has a long ethylene chain. Namely, the multicomponent copolymer having a high melting point of 100° C. or higher can be obtained by controlling the polymerization time and the constituent ratio in order that the time for polymerization of ethylene alone could be long.

The polystyrene-equivalent weight-average molecular weight (Mw) of the multicomponent copolymer of the present invention is preferably 10,000 to 10,000,000, more preferably 100,000 to 9,000,000, even more preferably 150,000 to 8,000,000. When Mw thereof is 10,000 or more, the multicomponent copolymer can sufficiently secure mechanical strength enough for rubber product materials, and when Mw is 10,000,000 or less, the copolymer can maintain high workability.

Further, of the multicomponent copolymer of the present invention, the molecular weight distribution (Mw/Mn) to be represented by the ratio of the weight-average molecular weight (Mw) to the number average molecular weight is preferably 10.0 or less, more preferably 9.0 or less, even more preferably 8.0 or less. The molecular weight distribution of the multicomponent copolymer of 10.0 or less could provide sufficient homogeneity for the physical properties of the multicomponent copolymer.

The weight-average molecular weight and the molecular weight distribution can be determined through gel permeation chromatography (GPC) using polystyrene as a standard substance.

The chain structure of the multicomponent copolymer of the present invention is not specifically limited and may be appropriately selected depending on the intended purpose, and examples thereof include a block copolymer having a structure where an $A_x$-$B_y$—$C_z$ (x, y and z each are an integer of 1 or more), in which A represents a conjugated diene unit, B represents a non-conjugated olefin unit and C represents an aromatic vinyl unit, a random copolymer having a structure where A, B and C are aligned randomly, a taper copolymer of a mixture of the random copolymer and the block copolymer, an alternate copolymer having a structure of $(A-B-C)_w$ (w is an integer of 1 or more), etc.

The multicomponent copolymer of the present invention may have a structure of a conjugated diene unit, a non-conjugated olefin unit and an aromatic vinyl unit linearly bonding to each other (linear structure), or a structure of a conjugated diene unit, a non-conjugated olefin unit and an aromatic vinyl unit bonding to each other where at least any of the units forms a branched chain (branched structure). In the case where the multicomponent copolymer of the present invention has a branched structure, the branched chain therein may also be a binary or multicomponent chain (in other words, in the case, the branched chain may contain at least two of a conjugated diene unit, a non-conjugated olefin unit and an aromatic vinyl unit). Accordingly, among the multicomponent copolymer of the present invention, a multicomponent copolymer having a branched structure that has a binary or multicomponent branched chain can be definitely differentiated from a conventional-type graft copolymer where the stem chain and the side chain each are formed of a different one type of unit.

(Production Method for Multicomponent Copolymer)
<Polymerization Step>

Next, examples of the production method for the multicomponent copolymer of the present invention are described in detail. One example of the production method for the multicomponent copolymer of the present invention has a preamble of using a conjugated diene compound, a non-conjugated olefin compound and an aromatic vinyl compound as monomers, and includes at least a polymerization step and optionally includes a coupling step, a washing step and any other step as needed.

Here, in production of the multicomponent copolymer of the present invention, preferably a non-conjugated olefin compound and an aromatic vinyl compound alone are added to a reactor and polymerized in the presence of a catalyst, without adding a conjugated diene compound thereto. In particular, in the case of using a polymerization catalyst composition to be mentioned below, a conjugated diene compound has a higher reactivity than a non-conjugated olefin compound and an aromatic vinyl compound, and therefore it would be difficult to polymerize at least one selected from the group consisting of a non-conjugated olefin compound and an aromatic vinyl compound in the presence of a conjugated diene compound. In addition, it would also be difficult to previously polymerize a conjugated diene compound and thereafter polymerize a non-conjugated olefin compound and an aromatic vinyl compound as additive polymerization, in view of the property of catalyst.

As the polymerization method, any arbitrary method is employable, such as a solution polymerization method, a suspension polymerization method, a liquid-phase bulk polymerization method, an emulsion polymerization method, a vapor-phase polymerization method, a solid-phase polymerization method, etc. In the case where a solvent is used for polymerization, the solvent may be any one that is inert in polymerization. Examples of the solvent include toluene, cyclohexane, normal hexane, etc.

The polymerization step may be a one-stage reaction or a two-stage or more multistage reaction. One-stage polymerization step is a step of polymerizing all the monomers to be polymerized at a time, that is, all a conjugated diene compound, a non-conjugated olefin compound, an aromatic vinyl compound and any other monomer, preferably all a conjugated diene compound a non-conjugated olefin compound and an aromatic vinyl compound at a time. The multistage polymerization step is a step of first reacting a part or all of one or two kinds of monomers to form a polymer (first polymerization stage), and then adding thereto a remaining kind of monomer and a remaining part of the former one or two kinds of monomers and polymerizing them in one or more stages (second polymerization stage to final polymerization stage).

In the polymerization step, preferably, the polymerization reaction is carried out in an atmosphere of an inert gas, preferably a nitrogen gas or an argon gas. The polymerization temperature for the polymerization reaction is not specifically limited, but is, for example, preferably within a range of −100° C. to 200° C., and may be room temperature or so. When the polymerization temperature is elevated, the cis-1,4-bond selectivity in the polymerization reaction may lower. The polymerization reaction pressure is preferably within a range of 0.1 to 10.0 MPa for the purpose of sufficiently taking a conjugated diene compound into the polymerization reaction system. The polymerization reaction time is not also specifically limited, and is, for example, preferably within a range of 1 second to 10 days. The time may be appropriately selected depending on the kind of catalyst and the condition of the polymerization temperature, etc.

In the polymerization step for a conjugated diene compound, a polymerization terminator such as methanol, ethanol, 2-propanol or the like may be used for terminate the polymerization.

Here, the polymerization step for a non-conjugated olefin compound, an aromatic vinyl compound and a conjugated diene compound preferably includes a step of polymerizing various monomers in the presence of a first polymerization catalyst composition, a second polymerization catalyst composition, a third polymerization catalyst composition or a fourth polymerization catalyst composition to be mentioned below.

In the present invention, the polymerization step is preferably carried out in a mode of multistage polymerization. More preferably, the polymerization step includes a first step of mixing a first monomer material containing at least an aromatic vinyl compound and a polymerization catalyst to prepare a polymerization mixture, and a second step of adding a second monomer material containing at least one selected from the group consisting of a conjugated diene compound, a non-conjugated olefin compound and an aromatic vinyl compound, to the polymerization mixture, in which, more preferably, the first monomer material does not contain a conjugated diene compound and the second monomer material contains a conjugated diene compound. At least any of the first monomer material and the second monomer material contains a non-conjugated olefin compound.

Preferably, the first step is carried out inside a reactor in an atmosphere of an inert gas, preferably a nitrogen gas or an argon gas. The temperature (reaction temperature) in the first step is not specifically limited, and is, for example, preferably within a range of −100 to 200° C., or may also be room temperature or so. The pressure in the first step is not also specifically limited, but is preferably within a range of 0.1 to 10.0 MPa for the purpose of sufficiently taking an aromatic vinyl compound into the polymerization reaction system. The time to be spent for the first step (reaction time) may be appropriately selected depending on the type of the polymerization catalyst and the condition of the reaction temperature, etc. In the case where the reaction temperature is 25 to 80° C., the reaction time is preferably 5 minutes to 500 minutes.

In the first step, for the polymerization method for obtaining the polymerization mixture, any arbitrary method is employable, such as a solution polymerization method, a suspension polymerization method, a liquid-phase bulk polymerization method, an emulsion polymerization method, a vapor-phase polymerization method, a solid-phase polymerization method, etc. In the case where a solvent is used for the polymerization, the solvent may be any one that is inert in polymerization, and examples thereof include toluene, cyclohexanone, normal hexane, etc.

In the first step, a non-conjugated olefin compound may be used along with an aromatic vinyl compound. The entire amount of an aromatic vinyl compound may be used, or a part thereof may be used.

The second step is a step of adding a second monomer material containing at least one selected from the group consisting of a conjugated diene compound, a non-conjugated olefin compound and an aromatic vinyl compound, to the polymerization mixture obtained in the first step. Here, the second monomer material preferably contains a conjugated diene compound. Specifically, the monomer material contained in the second monomer material is preferably a conjugated diene compound alone, or a conjugated diene compound and a non-conjugated olefin compound, or a conjugated diene compound and an aromatic vinyl compound, or a conjugated diene compound, a non-conjugated olefin compound and an aromatic compound.

In the case where the second monomer material to be used in the second step contains at least one selected from the group consisting of a non-conjugated olefin compound and an aromatic vinyl compound in addition to a conjugated diene compound, these monomer materials may be previously mixed along with a solvent or the like and then added to the polymerization mixture, or each monomer material may be added thereto in the form of a single state. The monomer materials may be added at a time, or may be added successively. In the second step, the method of adding the second monomer material to the polymerization mixture is not specifically limited, but preferably, the monomer mixture is continuously added to the polymerization mixture while the flow rate of each monomer material is controlled (in a so-called metering mode). Here, in the case where a monomer material that is a vapor under the condition of a polymerization reaction system (for example, ethylene or the like as a non-conjugated olefin compound under the condition of room temperature and normal pressure) is used, the material may be introduced into the polymerization reaction system under a predetermined pressure.

Preferably, the second step is carried out in an atmosphere of an inert gas, preferably a nitrogen gas or an argon gas. The temperature (reaction temperature) in the second step is not specifically limited, and is, for example, preferably within a range of −100 to 200° C., or may also be room temperature or so. When the reaction temperature is elevated, the cis-1, 4-bond selectivity in the conjugated diene unit may lower. The pressure in the second step is not also specifically limited, but is preferably within a range of 0.1 to 10.0 MPa for the purpose of sufficiently taking at least a conjugated diene compound into the polymerization reaction system. The time to be spent for the second step (reaction time) is not specifically limited but is preferably within a range of 0.1 hours to 10 days. The time may be appropriately selected depending on the type of the polymerization catalyst and the condition of the reaction temperature, etc.

In the second step, a polymerization terminator such as methanol, ethanol, 2-propanol or the like may be used for terminating the polymerization.

The first polymerization catalyst composition, the second polymerization catalyst composition, the third polymerization catalyst composition and the fourth polymerization catalyst composition that may be favorably used in the polymerization step are described below.

—First Polymerization Catalyst Composition—

The first polymerization catalyst composition is described.

The first polymerization catalyst composition includes a polymerization catalyst composition containing:

Component (A1): a rare earth element compound, or a reaction product of a rare earth element compound and a Lewis base, which does not have a bond between rare earth element and carbon, Component (B1): at least one selected from the group consisting of an ionic compound (B1-1) of a non-coordinating anion and a cation, (B1-2) an aluminoxane, and (B1-3) at least one halogen compound among a Lewis acid, a complex compound of a metal halide and a Lewis base, and an active halogen-containing organic compound.

In the case where the first polymerization catalyst composition contains at least one selected from the group consisting of an ionic compound (B1-1) and a halogen compound (B1-3), the polymerization catalyst composition further contains:

Component (C1): an organic metal compound represented by the following formula (I):

wherein Y represents a metal selected from Group 1, Group 2, Group 12 and Group 13 of the Periodic Table, $R^1$ and $R^2$ each represent a monovalent hydrocarbon group having 1 to 10 carbon atoms, or a hydrogen atom, $R^3$ represents a monovalent hydrocarbon group having 1 to 10 carbon atoms, $R^1$, $R^2$ and $R^3$ may be the same as or different from each other, when Y is a metal selected from Group 1 of the Periodic Table, a is 1 and b and c are 0, when Y is a metal selected from Group 2 and Group 12 of the Periodic Table, a and b are 1 and c is 0, when Y is a metal selected from Group 13 of the Periodic Table, a, b and c are 1.

The ionic compound (B1-1) and the halogen compound (B1-3) do not have a carbon atom to be supplied to the component (A1), and therefore the composition of the case needs the component (C1) as a carbon source to the component (A1). Even when the polymerization catalyst composition contains the aluminoxane (B1-2), the polymerization catalyst composition may contain the component (C1). In addition, the first polymerization catalyst composition may contain any other component that may be contained in ordinary rare earth element compound-containing polymerization catalyst compositions, for example, a co-catalyst, etc.

Preferably, in a polymerization reaction system, the concentration of the component (A1) contained in the first polymerization catalyst composition is within a range of 0.1 to 0.0001 mol/l.

Further, the polymerization catalyst composition preferably contains an additive (D1) that may be an anionic ligand.

The component (A1) to be used in the first polymerization catalyst composition is a rare earth element compound, or a reaction product of a rare earth element compound and a Lewis base. Here, the rare earth element compound and the reaction product of a rare earth element compound and a Lewis base does not have a bond between rare earth element and carbon. In the case where the rare earth element compound and the reaction product does not have a rare earth element-carbon bond, the compound is stable and is easy to handle. Here, the rare earth element compound is a compound containing a rare earth element (M), that is, a lanthanoid element composed of elements of Atomic Numbers 57 to 71 in the Periodic Table, or scandium or yttrium.

Specific examples of the lanthanoid element include lanthanum, cerium, praseodymium, neodymium, promethium, samarium, europium, gadolinium, terbium, dysprosium, holmium, erbium, thulium, ytterbium, and lutetium. One alone or two or more kinds of the components (A1) may be used either singly or as combined.

Preferably, the rare earth element compound is a salt or complex compound where the rare earth metal is divalent or trivalent, and is more preferably a rare earth element compound containing one or more ligands selected from a hydrogen atom, a halogen atom and an organic compound residue. Further, the rare earth element compound or the reaction product of a rare earth element compound and a Lewis base is preferably represented by following formula (II) or (III):

wherein $M^{11}$ represents a lanthanoid element, scandium or yttrium, $X^{11}$ each independently represents a hydrogen atom, a halogen atom, an alkoxy group, a thiolate group, an amino group, a silyl group, an aldehyde residue, a ketone residue, a carboxylic acid residue, a thiocarboxylic acid residue or a phosphorus compound residue, $L^{11}$ represents a Lewis base, and w represents 0 to 3.

The group (ligand) that bonds to the rare earth element of the rare earth element compound includes a hydrogen atom, a halogen atom, an alkoxy group (a group resulting from removal of hydrogen from the hydroxy group of an alcohol, and this forms a metal alkoxide), a thiolate group (a group resulting from removal of hydrogen from the thiol group of a thiol compound, and this forms a metal thiolate), an amino group (a group resulting from removal of one hydrogen atom bonding to the nitrogen atom of an ammonia, a primary amine or a secondary amine, and this forms a metal amide), a silyl group, an aldehyde residue, a ketone residue, a carboxylic acid residue, a thiocarboxylic acid residue or a phosphorus compound residue. Specifically, the group includes a hydrogen atom; an aliphatic alkoxy group such as a methoxy group, an ethoxy group, a propoxy group, a n-butoxy group, an isobutoxy group, a sec-butoxy group, a tert-butoxy group, etc.; an aromatic alkoxy group such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, a 2-isopropyl-6-neopentylphenoxy group, etc.; an aliphatic thiolate group such as a thiomethoxy group, a thioethoxy group, a thiopropoxy group, a thio-n-butoxy group, a thio-isobutoxy group, a thio-sec-butoxy group, a thio-tert-butoxy group, etc.; an arylthiolate group such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-neopentylthiophenoxy group, a 2-isopropyl-6-neopentylthiophenoxy group, a 2,4,6-triisopropylthiophenoxy group, etc.; an aliphatic amino group such as a dimethylamino group, a diethylamino group, a diisopropylamino group, etc.; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tri-tert-butylphenylamino group, etc.; a bistrialkylsilylamino group such as a bistrimethylsilylamino group, etc.; a silyl group such as a trimethylsilyl group, a tris(trimethylsilyl)silyl group, a bis(trimethylsilyl)methylsilyl group, a trimethylsilyl(dimethyl)silyl group, a triisopropylsilyl(bistrimethylsilyl)silyl group, etc.; and a halogen atom such as a fluorine atom, a chlorine atom, a bromine atom, an iodine atom, etc. Further, the group includes a residue of an aldehyde such as salicylaldehyde, 2-hydroxy-1-naphthaldehyde, 2-hydroxy-3-naphthaldehyde, etc.; a residue of a hydroxyphenone such as 2'-hydroxyacetophenone, 2'-hydroxybutyrophenone, 2'-hydroxypropiophenone, etc.; a residue of a diketone such as acetylacetone, benzoylacetone, propionylacetone, isobutylacetone, valerylacetone, ethylacetylacetone, etc.; a residue of a carboxylic acid such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, Versatic acid [trade name by Shell Chemicals Japan Ltd., synthetic acid composed of a mixture of C10 monocarboxylic acid isomers], phenylacetic acid, benzoic acid, 2-naphthoic acid, maleic acid, succinic acid, etc.; a residue of a thiocarboxylic acid such as hexane thioacid, 2,2-dimethylbutane thioacid, decane thioacid, thiobenzoic acid, etc.; a residue of a phosphate ester such as dibutyl phosphate, dipentyl phosphate, dihexyl phosphate, diheptyl phosphate, dioctyl phosphate, bis(2-ethylhexyl) phosphate, bis(1-methylheptyl) phosphate, dilauroyl phosphate, dioleyl phosphate, diphenyl phosphate, bis(p-nonylphenyl) phosphate, bis(polyethylene glycol-p-nonylphenyl) phosphate, (butyl)(2-ethylhexyl) phosphate, (1-methylheptyl)(2-ethylhexyl) phosphate, (2-ethylhexyl)(p-nonylphenyl) phosphate, etc.; a residue of a phosphonate ester such as monobutyl 2-ethylhexylphosphonate, mono-2-ethylhexyl 2-ethylhexylphosphonate, mono-2-ethylhexyl phenylphosphonate, mono-p-nonylphenyl 2-ethylhexylphosphonate, mono-2-ethylhexyl phosphonate, mono-1-methylheptyl phosphonate, mono-p-nonylphenyl phosphonate, etc.; and a residue of a phosphinic acid such as dibutylphosphinic acid, bis(2-ethylhexyl)phosphinic acid, bis(1-methylheptyl)phosphinic acid, dilaurylphosphinic acid, dioleylphosphnic acid, diphenylphosphinic acid, bis(p-nonylphenyl)phosphinic acid, butyl(2-ethylhexyl)phosphinic acid, (2-ethylhexyl)(1-methylheptyl)phosphinic acid, (2-ethylhexyl)(p-nonylphenyl)phosphinic acid, butylphosphinic acid, 2-ethylhexylphosphinic acid, 1-methylheptylphoshinic acid, oleylphosphinic acid, laurylphosphinic acid, phenylphosphinic acid, p-nonylphenylphosphinic acid, etc. One alone or two or more kinds of these ligands may be used either singly or as combined.

In the component (A1) to be used in the first polymerization catalyst composition, examples of the Lewis base to react with the above-mentioned rare earth element compound include tetrahydrofuran, diethyl ether, dimethylaniline, trimethyl phosphine, lithium chloride, neutral olefins, neutral diolefins, etc. Here, in the case where the rare earth element compound reacts with plural Lewis bases (where w is 2 or 3 in the formula (II) and the formula (III)), the Lewis bases $L^{11}$'s may be the same or different.

Favorably, the rare earth element compound preferably contains a compound represented by the following formula (IV);

$$M\text{-}(NQ^1)(NQ^2)(NQ^3) \qquad (IV)$$

wherein M is at least one selected from a lanthanoid element, scandium and yttrium, $NQ^1$, $NQ^2$ and $NQ^3$ each represent an amino group, and these may be the same or different, and have an M-N bond.

Specifically, the compound represented by the formula (IV) is characterized by having three M-N bonds. Having three M-N bonds, the compound has advantages in that the structure thereof is stable since each bond therein is chemically equivalent to each other, and therefore the compound is easy to handle.

In the above formula (IV), the amino group represented by NQ (NW, $NQ^2$ and $NQ^3$) may be any of an aliphatic amino group such as a dimethylamino group, a diethylamino group, a diisopropylamino group, etc.; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tri-tert-butylphenylamino group, etc.; and a bistrialkylsilylamino group such as a bistrimethylsilylamino group, etc., but is preferably a bistrimethylsilylamino group.

The component (B1) to be used in the first polymerization catalyst composition is at least one selected from the group consisting of an ionic compound (B1-1), an aluminoxane (B1-2) and a halogen compound (B1-3). The total content of the component (B1) in the first polymerization catalyst composition is preferably 0.1 to 50 times by mol the component (A1).

The ionic compound (B1-1) includes an ionic compound that is composed of a non-coordinating anion and a cation and reacts with a rare earth element compound or a reaction product thereof and a Lewis base of the component (A1) to form a cationic transition metal compound. Here, examples of the non-coordinating anion include tetraphenyl borate, tetrakis(monofluorophenyl) borate, tetrakis(difluorophenyl) borate, tetrakis(trifluorophenyl) borate, tetrakis(tetrafluorophenyl) borate, tetrakis(pentafluorophenyl) borate, tetrakis(tetrafluoromethylphenyl) borate, tetra(tolyl) borate, tetra (xylyl) borate, (triphenyl,pentafluorophenyl) borate, [tri(pentafluorophenyl), phenyl] borate, tridecahydride-7,8-dicarbaundecaborate, etc. On the other hand, the cation includes a carbonium cation, an oxonium cation, an ammonium cation, a phosphonium cation, a cycloheptatrienyl cation, a transition metal-having ferrocenium cation, etc. Specific examples of the carbonium cation include a trisubstituted carbonium cation such as a triphenylcarbonium cation, a tri(substituted phenyl)carbonium cation, etc. More specifically, the tri(substituted phenyl)carbonium cation includes a tri(methylphenyl)carbonium cation, a tri(dimethylphenyl)carbonium cation, etc. Specific examples of the ammonium cation include a trialkylammonium cation such as a trimethylammonium cation, a triethylammonium cation, a tripropylammonium cation, a tributylammonium cation (for example, a tri(n-butyl)ammonium cation), etc.; an N,N-dialkylanilinium cation such as an N,N-dimethylanilinium cation, an N,N-diethylanilinium cation, an N,N,2,4,6-pentamethylanilinium cation, etc.; and a dialkylammonium cation such as a diisopropylammonium cation, a dicyclohexylammonium cation, etc. Specific examples of the phosphonium cation include a triarylphosphonium cation such as a triphenylphosphonium cation, a tri(methylphenyl) phosphonium cation, a tri(dimethylphenyl)phosphonium cation, etc. Accordingly, as the ionic compound, a compound constructed by selecting the above-mentioned non-coordinating anion and the cation and combining them is preferred. Specifically, N,N-dimethylanilinium tetrakis(pentafluorophenyl)borate, triphenylcarbonium tetrakis(pentafluorophenyl)borate and the like are preferred. One alone or two or more kinds of these ionic compounds may be used either singly or as combined. The content of the ionic compound (B1-1) in the first polymerization catalyst composition is preferably 0.1 to 10 times by mol the component (A1), more preferably about 1 time by mol.

The above-mentioned aluminoxane (B1-2) is a compound obtained by bringing an organic aluminum compound into contact with a condensing agent, and examples thereof include a chain aluminoxane or a cyclic aluminoxane having a repeating unit represented by a formula: (—Al(R')O—) wherein R' represents a monovalent hydrocarbon group having 1 to 10 carbon atoms, a part of the hydrocarbon groups may be substituted with at least one selected from the group consisting of a halogen atom and an alkoxy group, and the degree of polymerization of the repeating unit is preferably 5 or more, more preferably 10 or more. Here, specific examples of R' include a methyl group, an ethyl group, a propyl group, an isobutyl group, etc., and among these, a methyl group is preferred. Examples of the organic aluminum compound to be used as the raw material for the aluminoxane include a trialkylaluminum such as trimethylaluminum, triethylaluminum, tributylaluminum, triisobutylaluminum, etc., and a mixture thereof. Trimethylaluminum is especially preferred. For example, an aluminoxane using a mixture of trimethylaluminum and tributylaluminum as the raw materials is preferably used. The content of the aluminoxane (B1-2) in the first polymerization catalyst composition is preferably such that the elemental ratio of the aluminum element Al of the aluminoxane to the rare earth element M that constitutes the component (A1), Al/M could be 10 to 1,000 or so.

The halogen compound (B1-3) is at least one of a Lewis acid, a complex compound of a metal halide and a Lewis base, and an active halogen-containing organic compound, and, for example, the compound can react with a rare earth element compound or a reaction product thereof with a Lewis base, which is the component (A1), thereby generating an cationic transition metal compound, a halogenated transition metal compound, or a compound in which the transition metal center is short in charge. The total content of the halogen compound (B1-3) in the first polymerization catalyst composition is preferably 1 to 5 times by mol the component (A1).

As the Lewis acid, a boron-containing halogen compound such as $B(C_6F_5)_3$ or the like, or an aluminum-containing halogen compound such as $Al(C_6F_5)_3$ or the like is usable, and in addition, a halogen compound containing an element belonging to Group 3, Group 4, Group 5, Group 6 or Group 8 of the Periodic Table is also usable. An aluminum halide or an organic metal halide is preferably used. The halogen element is preferably chlorine or bromine. Specifically, the Lewis acid includes methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, etc. Among these, diethylaluminum chloride, ethylaluminum sesquichloride, ethylaluminum dichloride, diethylaluminum bromide, ethylaluminum sesquibromide and ethylaluminum dibromide are especially preferred.

The metal halide that constitutes the complex compound of a metal halide and a Lewis base includes beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, gold bromide, etc. Among these, magnesium chloride, calcium chloride, barium chloride, manganese chloride, zinc chloride, and copper chloride are preferred, and magnesium chloride, manganese chloride, zinc chloride and copper chloride are especially preferred.

As the Lewis base to constitute the complex compound of the metal halide and a Lewis base, a phosphorus compound, a carbonyl compound, a nitrogen compound, an ether compound, an alcohol and the like are preferred. Specifically, the Lewis base includes tributyl phosphate, tri-2-ethylhexyl phosphate, triphenyl phosphate, tricresyl phosphate, triethyl phosphine, tributyl phosphine, triphenyl phosphine, diethylphosphinoethane, diphenylphosphinoethane, acetylacetone, benzoylacetone, propionylacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, napthenic acid, Versatic acid, triethylamine, N,N-dimethylacetamide, tetrahydrofuran, diphenyl ether, 2-ethylhexyl alcohol, oleyl alcohol, stearyl alcohol, phenol, benzyl alcohol, 1-decanol, lauryl alcohol, etc. Among these, tri-2-ethylhexyl phosphate, tricresyl phosphate, acetylacetone, 2-ethylhexanoic acid, Versatic acid, 2-ethylhexyl alcohol, 1-decanol, and lauryl alcohol are preferred.

The Lewis base is reacted in a ratio of preferably 0.01 to 30 mol, more preferably 0.5 to 10 mol relative to 1 mol of the metal halide. Using the reaction product of the Lewis base reduces the metal to remain in the polymer.

The active halogen-containing organic compound includes benzyl chloride, etc.

The component (C1) for use in the first polymerization catalyst composition is an organic metal compound represented by the following formula (I):

$$YR^1_a R^2_b R^3_c \quad (I)$$

wherein Y represents a metal selected from Group 1, Group 2, Group 12 and Group 13 of the Periodic Table, $R^1$ and $R^2$ each represent a monovalent hydrocarbon group having 1 to 10 carbon atoms, or a hydrogen atom, $R^3$ represents a monovalent hydrocarbon group having 1 to 10 carbon atoms, $R^1$, $R^2$ and $R^3$ may be the same as or different from each other, when Y is a metal selected from Group 1 of the Periodic Table, a is 1 and b and c are 0, when Y is a metal selected from Group 2 and Group 12 of the Periodic Table, a and b are 1 and c is 0, when Y is a metal selected from Group 13 of the Periodic Table, a, b and c are 1, and is preferably an organic aluminum compound represented by the following formula (V):

$$AlR^1 R^2 R^3 \quad (V)$$

wherein $R^1$ and $R^2$ each represent a monovalent hydrocarbon group having 1 to 10 carbon atoms, or a hydrogen atom, $R^3$ represents a monovalent hydrocarbon group having 1 to 10 carbon atoms, and $R^1$, $R^2$ and $R^3$ may be the same as or different from each other.

The organic aluminum compound represented by the formula (V) includes trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydride, n-propylaluminum dihydride, isobutylaluminum dihydride, etc. Among these, triethylaluminum, triisobutylaluminum, diethylaluminum hydride, and diisobutylaluminum hydride are preferred. One alone or two or more kinds of the organic aluminum compounds as the component (C1) mentioned above may be used either singly or as combined. The content of the organic aluminum compound in the first polymerization catalyst composition is preferably 1 to 50 times by mol the component (A1), more preferably about 10 times by mol.

Adding the additive (D1) to be an anionic ligand is preferred as exhibiting an effect of producing a multicomponent copolymer having a higher cis-1,4-bond content with high yield.

The additive (D1) is not specifically limited so far as it is exchangeable with the amino group of the component (A1), but is preferably one having any of an OH group, an NH group and an SH group.

Specific examples of the compound having an OH group include an aliphatic alcohol, an aromatic alcohol, etc. Specifically, the compound includes, though not limited thereto, 2-ethyl-1-hexanol, dibutylhydroxytoluene, alkylated phenol, 4,4'-thiobis(6-t-butyl-3-methylphenol), 4,4'-butylidenebis(6-t-butyl-3-methylphenol), 2,2'-methylenebis(4-methyl-6-t-butylphenol), 2,2'-methylenebis(4-ethyl-6-t-butylphenol), 2,6-di-t-butyl-4-ethylphenol, 1,1,3-tris(2-methyl-4-hydroxy-5-t-butylphenyl)butane, n-octadecyl-3-(4-hydroxy-3,5-di-t-butylphenyl)propionate, tetrakis[methylene-3-(3,5-di-t-butyl-4-hydroxyphenyl)propionate]methane, dilaurylthio dipropionate, distearylthio dipropionate, dimyristylthio dipropionate, etc. Examples of hindered phenol-type compounds include triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythryl-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamamide), 3,5-di-t-butyl-4-hydroxydibenzyl phosphonate diethyl ester, 1,3,5-trimethyl-2,4,6-tris(3,5-di-t-butyl-4-hydroxybenzyl)benzene, tris(3,5-di-t-butyl-4-hydroxybenzyl)-isocyanurate, octylated diphenylamine, 2,4-bis[(octylthio)methyl]-o-cresol, etc. Hydrazine-type compounds include N,N'-bis[3-(3,5-di-t-butyl-4-hydroxyphenyl)propionyl]hydrazine.

The compound having an NH group includes a primary amine such as an alkylamine, an arylamine, etc., and a secondary amine. Specifically, the compound includes dimethylamine, diethylamine, pyrrole, ethanolamine, diethanolamine, dicyclohexylamine, N,N'-dibenzylethylenediamine, bis(2-diphenylphosphinophenyl)amine, etc.

The compound having an SH group includes an aliphatic thiol, an aromatic thiol, etc., and in addition, compounds represented by the following formulae (VI) and (VII):

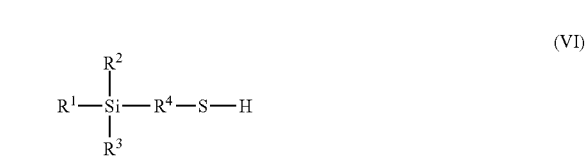

(VI)

wherein $R^1$, $R^2$ and $R^3$ each are independently represented by $-O-C_jH_{2j+1}$, $-(O-C_kH_{2k}-)_a-O-C_mH_{2m+1}$ or $-C_nH_{2n+1}$, j, m and n each independently represent an integer of 0 to 12, k and a each independently represent an integer of 1 to 12, and $R^4$ represents a linear, branched or cyclic, and saturated or unsaturated, alkylene, cycloalkylene, cycloalkylalkylene, cycloalkenylalkylene, alkenylene, cycloalkenylene, cycloalkylalkenylene, cycloalkenylalkenylene, arylene or aralkylene group each having 1 to 12 carbon atoms.

Specific examples of the compound represented by the formula (VI) include 3-mercaptopropyltrimethoxysilane, 3-mercaptopropyltriethoxysilane, 3-mercaptopropylmethyldimethoxysilane, (mercaptomethyl)dimethylethoxysilane, mercaptomethyltrimethoxysilane, etc.

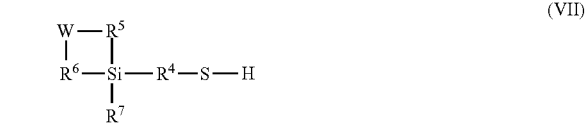

(VII)

wherein W represents $-NR^8-$, $-O-$ or $-CR^9R^{10}-$ (where $R^8$ and $R^9$ each represent $-C_pH_{2p+1}$, $R^{10}$ represents $-C_qH_{2q+1}$, and p and q each independently represent an integer of 0 to 20), $R^5$ and $R^6$ each independently represent -M-$C_rH_{2r}-$ (where M represents $-O-$ or $-CH_2-$, r represents an integer of 1 to 20), $R^7$ represents $-O-C_jH_{2j+1}$, $-(O-C_kH_{2k}-)_a-O-C_mH_{2m+1}$ or $-C_nH_{2n+1}$, j, m and n each independently represent an integer of 0 to 12, k and a each independently represent an integer of 1 to 12, and $R^4$ represents a linear, branched or cyclic, and saturated or unsaturated, alkylene, cycloalkylene, cycloalkylalkylene, cycloalkenylalkylene, alkenylene, cycloalkenylene, cycloalkylalkenylene, cycloalkenylalkenylene, arylene or aralkylene group each having 1 to 12 carbon atoms.

Specific examples of the compound represented by the formula (VII) include 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, 3-mercaptopropyl(ethoxy)-1,3-dioxa-6-dodecylaza-2-silacyclooctane, etc.

As the additive (D1), an anionic terdentate ligand precursor represented by the following formula (VIII) is preferably used:

$E^1\text{-}T^1\text{-}X\text{-}T^2\text{-}E^2$ (VIII)

wherein X represents an anionic electron donating group containing a ligand atom selected from atoms of Group 15 of the Periodic Table, $E^1$ and $E^2$ each independently represent a neutral electron donating group containing a ligand atom selected from atoms of Group 15 and Group 16 of the Periodic Table, and $T^1$ and $T^2$ represent a crosslinking group that crosslinks X and $E^1$ and a crosslinking group that crosslinks X and $E^2$, respectively.

The additive (D1) is added preferably in an amount of 0.01 to 10 mol relative to 1 mol of the rare earth element compound, more preferably in an amount of 0.1 to 1.2 mol. When the added amount is 0.1 mol or more, the monomer polymerization runs on to attain the intended object of the present invention. The amount to be added is preferably equivalent (1.0 mol) to the rare earth element compound, but an excessive amount of the additive may be added. The amount to be added is preferably 1.2 mol or less, as reducing reagent loss.

In the above formula (VIII), the electron donating group for $E^1$ and $E^2$ is a group containing a ligand atom selected from atoms of Group 15 and Group 16 of the Periodic Table. $E^1$ and $E^2$ may be the same group, or may be different groups. Examples of the ligand atom include nitrogen N, phosphorus P, oxygen O, sulfur S, etc., and P is preferred.

In the case where the ligand atom contained in $E^1$ and $E^2$ is P, examples of the neutral electron donating group for $E^1$ and $E^2$ include a diarylphosphino group such as a diphenylphosphino group, a ditolylphosphino group, etc.; a dialkylphosphino group such as a dimethylphosphino group, a diethylphosphino group, etc.; and an alkylarylphosphino group such as a methylphenylphosphino group, etc. A diarylphosphino group is preferred.

In the case where the ligand atom contained in $E^1$ and $E^2$ is N, examples of the neutral electron donating group for $E^1$ and $E^2$ include a dialkylamino group and a bis(trialkylsilyl)amino group such as a dimethylamino group, a diethylamino group, a bis(trimethylsilyl)amino group, etc.; a diarylamino group such as a diphenylamino group, etc.; and an alkylarylamino group such as a methylphenylamino group, etc.

In the case where the ligand atom contained in $E^1$ and $E^2$ is O, examples of the neutral electron donating group for $E^1$ and $E^2$ include an alkoxy group such as a methoxy group, an ethoxy group, a propoxy group, a butoxy group, etc.; and an aryloxy group such as a phenoxy group, a 2,6-dimethylphenoxy group, etc.

In the case where the ligand atom contained in $E^1$ and $E^2$ is S, examples of the neutral electron donating group for $E^1$ and $E^2$ include an alkylthio group such as a methylthio group, an ethylthio group, a propylthio group, a butylthio group, etc.; and an arylthio group such as a phenylthio group, a tolylthio group, etc.

The anionic electron donating group X is a group containing a ligand atom selected from Group 15 of the Periodic Table. The ligand atom is preferably phosphorus P or nitrogen N, more preferably N.

The crosslinking groups $T^1$ and $T^2$ may be groups capable of crosslinking X, and $E^1$ or $E^2$, respectively, and examples thereof include an arylene group optionally having a substituent on the aryl ring thereof. $T^1$ and $T^2$ may be the same groups or different groups.

Examples of the arylene group include a phenylene group, a naphthylene group, a pyridylene group, a thienylene group, and are preferably a phenylene group and a naphthylene group. Any arbitrary substituent may be on the aryl ring of the arylene group. Examples of the substituent include an alkyl group such as a methyl group, an ethyl group, etc.; an aryl group such as a phenyl group, a tolyl group, etc.; a halogen group such as fluorine, chlorine, bromine, etc.; and a silyl group such as a trimethylsilyl group, etc.

More preferred examples of the arylene group include a 1,2-phenylene group.

—Second Polymerization Catalyst Composition—

Next, the second polymerization catalyst composition is described. The second polymerization catalyst composition includes a polymerization catalyst composition containing at least one complex selected from the group consisting of a metallocene complex represented by the following formula (IX):

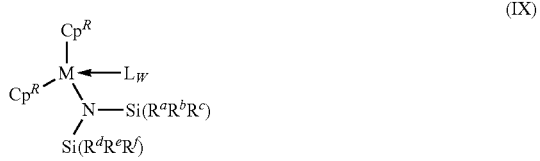

(IX)

wherein M represents a lanthanoid element, scandium or yttrium, $Cp^R$ each independently represents a substituted or unsubstituted indenyl group, $R^a$ to $R^f$ each independently represent an alkyl group having 1 to 3 carbon atoms, or a hydrogen atom, L represents a neutral Lewis base, w represents an integer of 0 to 3, and a metallocene complex represented by the following formula (X):

(X)

wherein M represents a lanthanoid element, scandium or yttrium, $Cp^R$ each independently represents a substituted or unsubstituted indenyl group, X' represents a hydrogen atom, a halogen atom, an alkoxy group, a thiolate group, an amino group, a silyl group, or a monovalent hydrocarbon group having 1 to 20 carbon atoms, L represents a neutral Lewis base, w represents an integer of 0 to 3), and a half-metallocene cation complex represented by the following formula (XI):

(XI)

wherein M represents a lanthanoid element, scandium or yttrium, $Cp^{R'}$ represents a substituted or unsubstituted cyclopentadienyl, indenyl or fluorenyl group, X represents a hydrogen atom, a halogen atom, an alkoxy group, a thiolate group, an amino group, a silyl group, or a monovalent hydrocarbon group having 1 to 20 carbon atoms, L represents a neutral Lewis base, w represents an integer of 0 to 3, $[B]^-$ represents a non-coordinating anion.

The second polymerization catalyst composition may further contain any other component that may be contained in ordinary metallocene complex-containing polymerization catalyst compositions, for example, a co-catalyst, etc. Here, the metallocene complex is a complex compound having one or more cyclopentadienyl groups or derivatives thereof bonding to the center atom therein, and in particular, a metallocene complex having one cyclopentadienyl group or a derivative thereof bonding to the center atom therein may be referred to as a half-metallocene complex.

In the polymerization reaction system, the concentration of the complex contained in the second polymerization catalyst composition is preferably within a range of 0.1 to 0.0001 mol/L.

In the metallocene complexes represented by the above formulae (IX) and (X), $Cp^R$ in the formulae is an unsubstituted indenyl group or a substituted indenyl group. $Cp^R$ that has an indenyl ring as the basic skeleton may be represented by $C_9H_{7-x}R_x$ or $C_9H_{11-x}R_x$. Here, x is an integer of 0 to 7 or 0 to 11. Preferably, R each independently represents a hydrocarbyl group or a metalloid group. The carbon number of the hydrocarbyl group is preferably 1 to 20, more preferably 1 to 10, even more preferably 1 to 8. Specifically, preferred examples of the hydrocarbyl group include a methyl group, an ethyl group, a phenyl group, a benzyl group, etc. On the other hand, examples of metalloid of the metalloid group include germyl Ge, stannyl Sn, and silyl Si. Preferably, the metalloid group has a hydrocarbyl group, and the hydrocarbyl group that the metalloid group has is the same as the above-mentioned hydrocarbyl group. Specifically, the metalloid group includes a trimethylsilyl group, etc. Specifically, the substituted indenyl group include 2-phenylindenyl, 2-methylindenyl, etc. Two $Cp^R$'s in the formulae (IX) and (X) may be the same as or different from each other.

In the half-metallocene cation complex represented by the above formula (XI), $Cp^{R'}$ in the formula is an unsubstituted or substituted cyclopentadienyl, indenyl or fluorenyl group, and among these, an unsubstituted or substituted indenyl group is preferred. $Cp^{R'}$ having a cyclopentadienyl ring as the basic skeleton is represented by $C_5H_{5-x}R_x$. x is an integer of 0 to 5. Preferably, R each independently represents a hydrocarbyl group or a metalloid group. The carbon number of the hydrocarbyl group is preferably 1 to 20, more preferably 1 to 10, even more preferably 1 to 8. Specifically, preferred examples of the hydrocarbyl group include a methyl group, an ethyl group, a phenyl group, a benzyl group, etc. On the other hand, examples of metalloid of the metalloid group include germyl Ge, stannyl Sn, and silyl Si. Preferably, the metalloid group has a hydrocarbyl group, and the hydrocarbyl group that the metalloid group has is the same as the above-mentioned hydrocarbyl group. Specifically, the metalloid group includes a trimethylsilyl group, etc. Specific examples of $Cp^{R'}$ that has a cyclopentadienyl ring as the basic skeleton include the following:

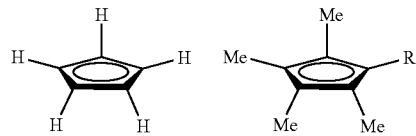

wherein R represents a hydrogen atom, a methyl group or an ethyl group.

In the formula (XI), $Cp^{R'}$ that has the above-mentioned indenyl ring as the basic skeleton is defined in the same manner as that for $Cp^R$ in the formula (IX), and preferred examples thereof are also the same as those of the latter.

In the formula (XI), $Cp^{R'}$ that has the above-mentioned fluorenyl ring as the basic skeleton may be represented by $C_{13}H_{9-x}R_x$ or $C_{13}H_{17-x}R_x$. Here, x represents an integer of 0 to 9, or 0 to 17. Preferably, R each independently represent a hydrocarbyl group or a metalloid group. The carbon number of the hydrocarbyl group is preferably 1 to 20, more preferably 1 to 10, even more preferably 1 to 8. Specifically, preferred examples of the hydrocarbyl group include a methyl group, an ethyl group, a phenyl group, a benzyl group, etc. On the other hand, examples of metalloid of the metalloid group include germyl Ge, stannyl Sn, and silyl Si. Preferably, the metalloid group has a hydrocarbyl group, and the hydrocarbyl group that the metalloid group has is the same as the above-mentioned hydrocarbyl group. Specifically, the metalloid group includes a trimethylsilyl group, etc.

The center metal M in the formulae (IX), (X) and (XI) is a lanthanoid element, scandium or yttrium. The lanthanoid element includes fifteen elements of Atomic Numbers 57 to 71, and any of these may be for the metal. Preferred examples of the center metal M include samarium Sm, neodymium Nd, praseodymium Pr, gadolinium Gd, cerium Ce, holmium Ho, scandium Sc and yttrium Y.

The metallocene complex represented by the formula (IX) includes a silylamide ligand $[-N(SiR_3)_2]$. The group R ($R^a$ to $R^f$ in the formula (IX)) contained in the silylamide ligand each independently represent an alkyl group having 1 to 3 carbon atoms, or a hydrogen atom. Preferably, at least one of $R^a$ to $R^f$ is a hydrogen atom. When at least one of $R^a$ to $R^f$ is a hydrogen atom, catalyst synthesis is easy, and in addition, since the bulkiness around silicon is low, a non-conjugated olefin compound and an aromatic vinyl compound could be readily introduced into the complex. From the same viewpoint, more preferably, at least one of $R^a$ to $R^c$ is a hydrogen atom and at least one of $R^d$ to $R^f$ is a hydrogen atom. Further, the alkyl group is preferably a methyl group.

The metallocene complex represented by the formula (X) contains a silyl ligand $[-SiX'_3]$. X' contained in the silyl ligand $[-SiX'_3]$ is a group defined in the same manner as that for X in the formula (XI), and preferred examples thereof are also the same as those of the latter.

In the formula (XI), X is a group selected from a hydrogen atom, a halogen atom, an alkoxy group, a thiolate group, an amino group, a silyl group and a monovalent hydrocarbon group having 1 to 20 carbon atoms. Here, the alkoxy group includes an aliphatic alkoxy group such as a methoxy group, an ethoxy group, a propoxy group, a n-butoxy group, an isobutoxy group, a sec-butoxy group, a tert-butoxy group, etc.; and an aryloxy group such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, a 2-isopropyl-6-neopentylphenoxy group, etc. Among these, a 2,6-di-tert-butylphenoxy group is preferred.

In the formula (XI), the thiolate group represented by X includes an aliphatic thiolate group such as a thiomethoxy group, a thioethoxy group, a thiopropoxy group, a thio-n-butoxy group, a thio-isobutoxy group, a thio-sec-butoxy group, a thio-tert-butoxy group, etc.; and an arylthiolate group such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-neopentylthiophenoxy group, a 2-isopropyl-6-neopentylthiophenoxy group, a 2,4,6-triisopropylthiophenoxy group, etc. Among these, a 2,4,6-triisopropylthiophenoxy group is preferred.

In the formula (XI), the amino group represented by X includes an aliphatic amino group such as a dimethylamino group, a diethylamino group, a diisopropylamino group, etc.; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tri-tert-butylphenylamino group, etc.; and a bistrialkylsilylamino group such as a bistrimethylsilylamino group, etc. Among these, a bistrimethylsilylamino group is preferred.

In the formula (XI), the silyl group represented by X includes a trimethylsilyl group, a tris(trimethylsilyl)silyl group, a bis(trimethylsilyl)methylsilyl group, a trimethylsilyl(dimethyl)silyl group, a triisopropylsilyl(bistrimethylsilyl)silyl group, etc. Among these, a tris(trimethylsilyl)silyl group is preferred.

In the formula (XI), the halogen atom represented by X may be any of a fluorine atom, a chlorine atom, a bromine atom or an iodine atom, but is preferably a chlorine atom or a bromine atom. Specifically, the monovalent hydrocarbon group having 1 to 20 carbon atoms that X represents includes a linear or branched aliphatic hydrocarbon group such as a methyl group, an ethyl group, an n-propyl group, an isopropyl group, an n-butyl group, an isobutyl group, a sec-butyl group, a tert-butyl group, a neopentyl group, a hexyl group, an octyl group, etc.; an aromatic hydrocarbon group such as a phenyl group, a tolyl group, a naphthyl group, etc.; an aralkyl group such as a benzyl group, etc.; and also a silicon atom-containing hydrocarbon group such as a trimethylsilylmethyl group, a bistrimethylsilylmethyl group, etc. Among these, a methyl group, an ethyl group, an isobutyl group and a trimethylsilylmethyl group are preferred.

In the formula (XI), X is preferably a bistrimethylsilylamino group, or a monovalent hydrocarbon group having 1 to 20 carbon atoms.

In the formula (XI), examples of the non-coordinating anion represented by [B]⁻ include a tetravalent boron anion. Specifically, the tetravalent boron anion includes a tetraphenylborate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl,pentafluorophenyl)borate, a [tris(pentafluorophenyl),phenyl]borate, a tridecahydride-7,8-dicarbaundecaborate, etc. Among these, a tetrakis(pentafluorophenyl)borate is preferred.

The metallocene complex represented by the above formulae (IX) and (X) and the half-metallocene complex represented by the above formula (XI) further contain 0 to 3, preferably 0 to 1 neutral Lewis base L. Here, example of the neutral Lewis base L include tetrahydrofuran, diethyl ether, dimethylaniline, trimethyl phosphine, lithium chloride, neutral olefins, neutral diolefins, etc. Here, in the case where the complex contains plural neutral Lewis bases L's, the neutral Lewis bases L's may be the same or different.

The metallocene complex represented by the above formulae (IX) and (X) and the half-metallocene complex represented by the above formula (XI) may exist as a monomer, or may also exist as a dimer or a more multimeric polymer.

The metallocene complex represented by the formula (IX) can be obtained, for example, by reacting a lanthanoid trishalide, a scandium trishalide or a yttrium trishalide with an indenyl salt (for example, potassium salt or lithium salt) and a bis(trialkylsilyl)amine salt (for example, potassium salt or lithium salt) in a solvent. The reaction temperature may be room temperature or so, and therefore the complex can be produced under a mild condition. Not defined, the reaction time may be a few hours to tens of hours or so. The reaction solvent is not specifically limited, but is preferably a solvent that dissolves raw materials and products, and for example, toluene may be used. A reaction example for producing the metallocene complex represented by the formula (IX) is shown below:

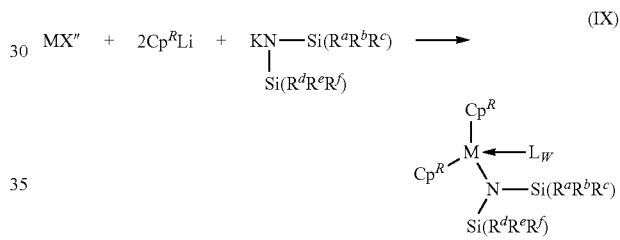

wherein X" represents a halide.

The metallocene complex represented by the formula (X) may be obtained, for example, by reacting a lanthanoid trishalide, a scandium trishalide or a yttrium trishalide with an indenyl salt (for example, potassium salt or lithium salt) and a silyl salt (for example, potassium salt or lithium salt) in a solvent. The reaction temperature may be room temperature or so, and therefore the complex can be produced under a mild condition. Not defined, the reaction time may be a few hours to tens of hours or so. The reaction solvent is not specifically limited, but is preferably a solvent that dissolves raw materials and products, and for example, toluene may be used. A reaction example for producing a metallocene complex represented by the formula (X) is shown below:

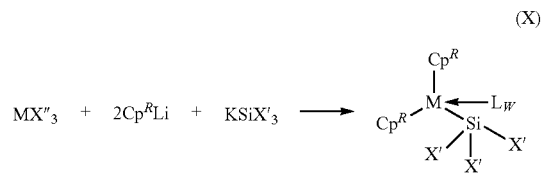

wherein X" represents a halide.

The half-metallocene cation complex represented by the formula (XI) may be obtained, for example, according to the following reaction.

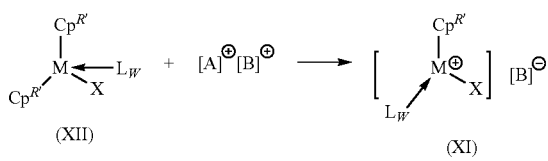

Here, in the compound represented by the formula (XII), M represents a lanthanoid element, scandium or yttrium, $Cp^{R'}$ each independently represents an unsubstituted or substituted cyclopentadienyl, indenyl or fluorenyl group, X represents a hydrogen atom, a halogen atom, an alkoxy group, a thiolate group, an amino group, a silyl group, or a monovalent hydrocarbon group having 1 to 20 carbon atoms, L represents a neutral Lewis base, w represents an integer of 0 to 3. In the ionic compound represented by the formula $[A]^+[B]^-$, $[A]^+$ represents a cation, $[B]^-$ represents a non-coordinating anion.

Examples of the cation represented by $[A]^+$ include a carbonium cation, an oxonium cation, an amine cation, a phosphonium cation, a cycloheptatrienyl cation, a transition metal-having ferrocenium cation, etc. The carbonium cation includes a tri-substituted carbonium cation such as a triphenylcarbonium cation, a tri(substituted phenyl)carbonium cation, etc. Specifically, the tri(substituted phenyl)carbonyl cation includes a tri(methylphenyl)carbonium cation, etc. The amine cation includes a trialkylammonium cation such as a trimethylammonium cation, a triethylammonium cation, a tripropylammonium cation, a tributylammonium cation, etc.; an N,N-dialkylanilinium cation such as an N,N-dimethylanilinium cation, an N,N-diethylanilinium cation, an N,N,2,4,6-pentamethylanilinium cation, etc.; and a dialkylammonium cation such as a diisopropylammonium cation, a dicyclohexylammonium cation, etc. The phosphonium cation includes a triarylphosphonium cation such as a triphenylphosphonium cation, a tri(methylphenyl)phosphonium cation, a tri(dimethylphenyl)phosphonium cation, etc. Among these cations, an N,N-dialkylanilinium cation and a carbonium cation are preferred, and an N,N-dialkylanilinium cation is especially preferred.

The ionic compound represented by the formula $[A]^+[B]^-$, which is used in the above-mentioned reaction, is a compound constructed by selectively combining the above-mentioned non-coordinating anion and cation, and N,N-dimethylanilinium tetrakis(pentafluorophenyl)borate, and triphenylcarbonium tetrakis(pentafluorophenyl)borate and the like are preferred. Preferably, the ionic compound is added in an amount of 0.1 to 10 times by mol, more preferably about 1 time by mol the metallocene complex. In the case where the half-metallocene cation complex represented by the formula (XI) is used in the polymerization reaction, the half-metallocene cation complex may be put into the polymerization reaction system as it is, or the compound represented by the formula (XII) to be used in the reaction and the ionic compound represented by the formula $[A]^+[B]^-$ may be separately put into the polymerization reaction system to form the half-metallocene cation complex represented by the formula (XI) in the reaction system. Alternatively, the metallocene complex represented by the formula (IX) or (X) and the ionic compound represented by $[A]^+[B]^-$ may be used as combined so as to form the half-metallocene cation complex represented by the formula (XI) in the reaction system.

Preferably, the structure of the metallocene complex represented by the formulae (IX) and (X) and the half-metallocene cation complex represented by the formula (XI) is determined through X-ray structural analysis.

The co-catalyst usable in the second polymerization catalyst composition may be arbitrarily selected from components that are usable as a co-catalyst for ordinary metallocene complex-containing polymerization catalyst compositions. Preferred examples of the co-catalyst include aluminoxanes, organic aluminium compounds, the above-mentioned ionic compounds, etc. One alone or two or more kinds of these co-catalyst may be used either singly or as combined.

The aluminoxane is preferably an alkylaluminoxane, and examples thereof include methylaluminoxane (MAO), modified methylaluminoxane, etc. As the modified methylaluminoxane, MMAO-3A (manufactured by Tosoh Finechem Corporation) and the like are preferred. The content of the aluminoxane in the second polymerization catalyst composition is preferably such that the elemental ratio of the aluminum element Al of the aluminoxane to the center element M of the metallocene complex, Al/M could be 10 to 1,000 or so, more preferably 100 or so.

On the other hand, the organic aluminum compound is preferably an organic aluminum compound represented by a general formula AlRR'R'' (where R and R' each independently represent a monovalent hydrocarbon group having 1 to 10 carbon atoms, a halogen atom, or a hydrogen atom, R'' represents a monovalent hydrocarbon group having 1 to 10 carbon atoms). Examples of the halogen atom include a fluorine atom, a chlorine atom, a bromine atom and an iodine atom, and a chlorine atom is preferred. Examples of the organic aluminum compound include a trialkylaluminum, a dialkylaluminum chloride, an alkylaluminum dichloride, a dialkylaluminum hydride, etc. Among these, a trialkylaluminum is preferred. Examples of the trialkylaluminum include triethylaluminum, triisobutylaluminum, etc. The content of the organic aluminum compound in the polymerization catalyst composition is preferably 1 to 50 times by mol the metallocene complex therein, more preferably about 10 times by mol.

Further, in the polymerization catalyst composition, the metallocene complex represented by the formulae (IX) and (X) or the half-metallocene cation complex represented by the formula (XI) may be combined with an appropriate co-catalyst suitable thereto so as to increase the cis-1,4-bond content and the molecular weight of the polymer to be obtained.

—Third Polymerization Catalyst Composition—

Next, the third polymerization catalyst composition is described.

The third polymerization catalyst composition includes a polymerization catalyst composition that contains a metallocene composite catalyst represented by the following formula (XIII) as a rare earth element-containing compound:

wherein R each independently represent an unsubstituted or substituted indenyl group, this R coordinates with M, M represents a lanthanoid element, scandium or yttrium, X each independently represent a monovalent hydrocarbon group having 1 to 20 carbon atoms, this X is in μ-coordination with M and Q, Q represents an element of Group 13 of the Periodic Table, Y each independently represents a monovalent hydrocarbon group having 1 to 20 carbon atoms, or a hydrogen atom, this Y coordinates with Q, and a and b are 2.

Preferred examples of the metallocene composite catalyst include a metallocene composite catalyst represented by the following formula (XIV):

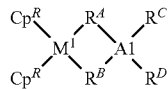

(XIV)

wherein $M^1$ represents a lanthanoid element, scandium or yttrium, $Cp^R$ each independently represents an unsubstituted or substituted indenyl group, $R^A$ and $R^B$ each independently represent a monovalent hydrocarbon group having 1 to 20 carbon atoms, these $R^A$ and $R^B$ are in μ-coordination with $M^1$ and Al, $R^C$ and $R^D$ each independently represent a monovalent hydrocarbon group having 1 to 20 carbon atoms, or a hydrogen atom.

Using the above-mentioned metallocene composite catalyst, a polymer can be produced. As the metallocene composite catalyst, a catalyst that has been previously complexed with an aluminum catalyst may be used to reduce the amount of the alkylaluminum for use in multicomponent copolymer synthesis, or to omit the alkylaluminum. When a conventional catalyst system is used, a large amount of an alkylaluminum must be used in multicomponent copolymer synthesis. For example, in a conventional catalyst system, an alkylaluminum in an amount of 10 molar equivalents or more is needed relative to the metal catalyst therein, but an alkylaluminum in an amount of about 5 molar times may be enough the metallocene composite catalyst to exhibit an excellent catalytic effect.

In the metallocene composite catalyst, the metal M in the formula (XIII) is a lanthanoid element, scandium or yttrium. The lanthanoid element includes 15 elements of Atomic Numbers 57 to 71, and any of these may be the metal. Preferably, the metal M is samarium Sm, neodymium Nd, praseodymium Pr, gadolinium Gd, cerium Ce, holmium Ho, scandium Sc or yttrium Y.

In the formula (XIII), R is independently an unsubstituted indenyl group or a substituted indenyl group, and this R coordinates with the metal M. Specific examples of the substituted indenyl group include a 1,2,3-trimethylindenyl group, a 1,2,4,5,6,7-hexamethylindenyl group, etc.

In the formula (XIII), Q is an element of Group 13 of the Periodic Table, and specifically includes boron, aluminum, gallium, indium, thallium, etc.

In the formula (XIII), X is independently a monovalent hydrocarbon group having 1 to 20 carbon atoms, and this X is in p-coordination with M and Q. Here, the monovalent hydrocarbon group having 1 to 20 carbon atoms includes a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, a stearyl group, etc. "μ-coordination" is meant to indicate a coordination mode that takes a crosslinking structure.

In the formula (XIII), Y is independently a monovalent hydrocarbon group having 1 to 20 carbon atoms, or a hydrogen atom, and this Y coordinates with Q. Here, the monovalent hydrocarbon group having 1 to 20 carbon atoms includes a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, a stearyl group, etc.

In the formula (XIV), the metal $M^1$ is a lanthanoid element, scandium or yttrium. The lanthanoid element includes 15 elements of Atomic Numbers 57 to 71, and any of these may be the metal. The metal $M^1$ is preferably samarium Sm, neodymium Nd, praseodymium Pr, gadolinium Gd, cerium Ce, holmium Ho, scandium Sc or yttrium Y.

In the formula (XIV), $Cp^R$ is an unsubstituted indenyl group or a substituted indenyl group. $Cp^R$ that has an indenyl ring as the basic skeleton may be represented by $C_9H_{7-X}R_X$ or $C_9H_{11-X}R_X$. Here, x is an integer of 0 to 7, or 0 to 11. Preferably, R is independently a hydrocarbyl group or a metalloid group. The carbon number of the hydrocarbyl group is preferably 1 to 20, more preferably 1 to 10, even more preferably 1 to 8. Specifically, preferred examples of the hydrocarbyl group include a methyl group, an ethyl group, a phenyl group, a benzyl group, etc. On the other hand, examples of metalloid of the metalloid group include germyl Ge, stannyl Sn and silyl Si. Preferably, the metalloid group has a hydrocarbyl group, and the hydrocarbyl group that the metalloid may have is the same as the above-mentioned hydrocarbyl group. Specifically, the metalloid group includes a trimethylsilyl group, etc.

Specifically, the substituted indenyl group includes a 2-phenylindenyl group, a 2-methylindenyl group, etc. Two $Cp^R$'s in the formula (XIV) may be the same as or different from each other.

In the formula (XIV), $R^A$ and $R^B$ are each independently a monovalent hydrocarbon group having 1 to 20 carbon atoms, and these $R^A$ and $R^B$ are in μ-coordination with $M^1$ and Al. Here, the monovalent hydrocarbon group having 1 to 20 carbon atoms includes a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, a stearyl group, etc. "μ-coordination" is meant to indicate a coordination mode that takes a crosslinking structure.

In the formula (XIV), $R^C$ and $R^D$ each are independently a monovalent hydrocarbon group having 1 to 20 carbon atoms, or a hydrogen atom. Here, the monovalent hydrocarbon group having 1 to 20 carbon atoms includes a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, a stearyl group, etc.

The metallocene composite catalyst can be obtained, for example, by reacting a metallocene complex represented by the following formula (XV):

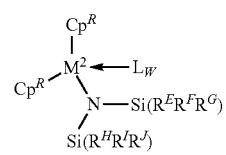

(XV)

wherein $M^2$ represents a lanthanoid element, scandium or yttrium, $Cp^R$ each independently represents an unsubstituted or substituted indenyl group, $R^E$ to $R^J$ each independently represent an alkyl group having 1 to 3 carbon atoms, or a hydrogen atom, L represents a neutral Lewis base, w represents an integer of 0 to 3, and an organic aluminum compound represented by AlR$^K$R$^L$R$^M$. The reaction temperature may be room temperature or so, and therefore the catalyst can be produced under a mild condition. Not defined, the reaction time may be a few hours to tens of hours or so. The reaction solvent is not specifically limited, but is preferably a solvent capable of dissolving raw materials and products. For example, toluene or hexane may be used. The structure of the metallocene composite catalyst is preferably determined through $^1$H-NMR or X-ray structural analysis.

In the metallocene complex represented by the formula (XV), Cp$^R$ is an unsubstituted indenyl or substituted indenyl group, and has the same meaning as Cp$^R$ in the formula (XIV). In the formula (XV), the metal M$^2$ is a lanthanoid element, scandium or yttrium, and has the same meaning as M$^1$ in the formula (XIV).

The metallocene complex represented by the formula (XV) contains a silylamide ligand [—N(SiR$_3$)$_2$]. The group R (groups R$^E$ to R$^J$) contained in the silylamide ligand each independently represent an alkyl group having 1 to 3 carbon atoms, or a hydrogen atom. Preferably, at least one of R$^E$ to R$^J$ is a hydrogen atom. When at least one of R$^E$ to R$^J$ is a hydrogen atom, the catalyst is easy to synthesis. Further, the alkyl group is preferably a methyl group.

The metallocene complex represented by the formula (XV) further contains 0 to 3, preferably 0 to 1 neutral Lewis base L. Here, examples of the neutral Lewis base L include tetrahydrofuran, diethyl ether, dimethylaniline, trimethyl phosphine, lithium chloride, neutral olefins, neutral diolefins, etc. Here, in the case where the complex contains plural neutral Lewis bases L's, the neutral Lewis bases L's may be the same or different.

The metallocene complex represented by the formula (XV) may exist as a monomer, or may exist as a dimer or a more multimeric polymer.

On the other hand, the organic aluminum compound to be used in producing the metallocene composite catalyst is represented by AlR$^K$R$^L$R$^M$, wherein R$^K$ and R$^L$ each independently represent a monovalent hydrocarbon group having 1 to 20 carbon atoms, or a hydrogen atom, R$^M$ represents a monovalent hydrocarbon group having 1 to 20 carbon atoms, and R$^M$ may be the same as or different from the above R$^K$ or R$^L$. The monovalent hydrocarbon group having 1 to 20 carbon atoms includes a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, a stearyl group, etc.

Specific examples of the organic aluminum compound include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydrides, n-propylaluminum dihydrides, isobutylaluminum dihydrides, etc. Among these, triethylaluminum, triisobutylaluminum, diethylaluminum hydride, and diisobutylaluminum hydride are preferred. One alone or two or more kinds of these organic aluminum compounds may be used either singly or as combined. The amount of the organic aluminum compound to be used for producing the metallocene composite catalyst is preferably 1 to 50 times by mol the metallocene complex, more preferably about 10 times by mol.

The third polymerization catalyst composition may contain the above-mentioned metallocene composite catalyst and a boron anion, and preferably further contains any other component that may be contained in ordinary metallocene catalyst-containing polymerization catalyst compositions, for example, a co-catalyst, etc. The metallocene composite catalyst and the boron anion, as combined, may be referred to as a two-component catalyst. The third polymerization catalyst composition further contains a boron anion, like the metallocene composite catalyst, and therefore in this, the content of each monomer component in the polymer to be produced can be controlled in any desired manner.

The boron anion to constitute the two-component catalyst in the third polymerization catalyst composition specifically includes a tetravalent boron anion. Examples of the anion include a tetraphenylborate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenyl,pentafluorophenyl)borate, a [tris(pentafluorophenyl),phenyl]borate, a tridecahydride-7,8-dicarbaundecaborate, etc. Among these, a tetrakis(pentafluorophenyl)borate is preferred.

The boron anion may be used as an ionic compound, as combined with a cation. Examples of the cation include a carbonium cation, an oxonium cation, an amine cation, a phosphonium cation, a cycloheptatrienyl cation, a transition metal-having ferrocenium cation, etc. The carbonium cation includes a tri-substituted carbonium cation such as a triphenylcarbonium cation, a tri(substituted phenyl)carbonium cation, etc. Specifically, the tri(substituted phenyl)carbonyl cation includes a tri(methylphenyl)carbonium cation, etc. The amine cation includes a trialkylammonium cation such as a trimethylammonium cation, a triethylammonium cation, a tripropylammonium cation, a tributylammonium cation, etc.; an N,N-dialkylanilinium cation such as an N,N-dimethylanilinium cation, an N,N-diethylanilinium cation, an N,N,2,4,6-pentamethylanilinium cation, etc.; and a dialkylammonium cation such as a diisopropylammonium cation, a dicyclohexylammonium cation, etc. The phosphonium cation includes a triarylphosphonium cation such as a triphenylphosphonium cation, a tri(methylphenyl)phosphonium cation, a tri(dimethylphenyl)phosphonium cation, etc. Among these cations, an N,N-dialkylanilinium cation and a carbonium cation are preferred, and an N,N-dialkylanilinium cation is more preferred. Accordingly, the ionic compound is preferably N,N-dimethylanilinium tetrakis(pentafluorophenyl)borate, triphenylcarbonium tetrakis(pentafluorophenyl)borate, etc. The ionic compound composed of a boron anion and a cation is added preferably in an amount of 0.1 to 10 times by mol the metallocene composite catalyst, more preferably about 1 time by mol.

When a boron anion exists in the reaction system of reacting a metallocene complex represented by the above formula (XV) and an organic aluminum compound, a metallocene composite catalyst of the above formula (XIV) could not be produced. Accordingly, in preparing the third polymerization catalyst composition, the metallocene composite catalyst is previously synthesized, and after the metallocene composite catalyst is isolated and purified, this must be combined with a boron anion.

Preferred examples of the co-catalyst usable in the third polymerization catalyst composition include the organic aluminum compound represented by AlR$^K$R$^L$R$^M$, as well as aluminoxanes, etc. The aluminoxane is preferably an alkylaluminoxane, and examples thereof include methylaluminoxane (MAO), modified methylaluminoxane, etc. The modified methylaluminoxane is preferably MMAO-3A (manufactured by Tosoh Finechem Corporation), etc. One alone or two or more kinds of these aluminoxanes may be used either singly or as combined.

—Fourth Polymerization Catalyst Composition—

The fourth polymerization catalyst composition contains a rare earth element compound and a compound having a cyclopentadiene skeleton.

The fourth polymerization catalyst composition must contain:

a rare earth element compound (hereinafter may be referred to as "component (A2)"), and a compound selected from the group consisting of a substituted or unsubstituted cyclopentadiene, a substituted or unsubstituted indene (indenyl group-having compound), and a substituted or unsubstituted fluorene (hereinafter may be referred to as "component (B2)").

The fourth polymerization catalyst composition may further contain:

an organic metal compound (hereinafter may be referred to as "component (C2)"), an aluminoxane compound (hereinafter may be referred to as "component (D2)"), and a halogen compound (hereinafter may be referred to as "component (E2)").

Preferably, the fourth polymerization catalyst composition has high solubility for aliphatic hydrocarbons, and preferably forms a homogeneous solution in an aliphatic hydrocarbon. Here, examples of the aliphatic hydrocarbon include hexane, cyclohexane, pentane, etc.

Also preferably, the fourth polymerization catalyst composition does not contain an aromatic hydrocarbon. Here, examples of the aromatic hydrocarbon include benzene, toluene, xylene, etc.

"Not containing an aromatic hydrocarbon" means that the ratio of the aromatic hydrocarbon, if any, in the polymerization catalyst composition is less than 0.1% by mass.

The component (A2) may be a rare earth element-containing compound or a reaction product of a rare earth element-containing compound and a Lewis base, having a metal-nitrogen bond (M-N bond).

Examples of the rare earth element-containing compound include a compound containing scandium, yttrium or a lanthanoid element composed of elements of Atomic Numbers 57 to 71, etc. Specifically, the lanthanoid element includes lanthanum, cerium, praseodymium, neodymium, promethium, samarium, europium, gadolinium, terbium, dysprosium, holmium, erbium, thulium, ytterbium, lutetium.

Examples of the Lewis base include tetrahydrofuran, diethyl ether, dimethylaniline, trimethyl phosphine, lithium chloride, neutral olefins, neutral diolefins, etc.

Here, preferably, the rare earth element-containing compound or the reaction product of a rare earth element-containing compound and a Lewis base does not have a bond of rare earth element and carbon. In the case where the reaction product of a rare earth element-containing compound and a Lewis base does not have a rare earth element-carbon bond, the reaction product is stable and is easy to handle.

One alone or two or more kinds of the above components (A2) may be used either singly or as combined.

Here, the component (A2) is preferably a compound represented by a formula (1):

$$M\text{-}(AQ^1)(AQ^2)(AQ^3) \tag{1}$$

wherein M represents at least one element selected from the group consisting of scandium, yttrium and a lanthanoid element, $AQ^1$, $AQ^2$ and $AQ^3$ may be the same as or different from each other, each representing a functional group, and A represents at least one selected from the group consisting of nitrogen, oxygen and sulfur, provided that the formula has at least one M-A bond.

Specifically, the lanthanoid element includes lanthanum, cerium, praseodymium, neodymium, promethium, samarium, europium, gadolinium, terbium, dysprosium, holmium, erbium, thulium, ytterbium, lutetium.

The above-mentioned compound can enhance the catalytic activity in the reaction system, can shorten the reaction time and can elevate the reaction temperature.

M in the formula (1) is, especially from the viewpoint of enhancing catalytic activity and reaction control performance, preferably gadolinium.

In the case where A in the formula (1) is nitrogen, the functional group represented by $AQ^1$, $AQ^2$ or $AQ^3$ (that is, $NQ^1$, $NQ^2$ or $NQ^3$) includes an amino group, etc. In this case, the formula has three M-N bonds.

Examples of the amino group include an aliphatic amino group such as a dimethylamino group, a diethylamino group, a diisopropylamino group, etc.; an arylamino group such as a phenylamino group, a 2,6-di-tert-butylphenylamino group, a 2,6-diisopropylphenylamino group, a 2,6-dineopentylphenylamino group, a 2-tert-butyl-6-isopropylphenylamino group, a 2-tert-butyl-6-neopentylphenylamino group, a 2-isopropyl-6-neopentylphenylamino group, a 2,4,6-tri-tert-butylphenylamino group, etc.; and a bistrialkylsilylamino group such as a bistrimethylsilylamino group, etc. In particular, from the viewpoint of solubility for aliphatic hydrocarbons and aromatic hydrocarbons, a bistrimethylsilylamino group is preferred. One alone or two or more kinds of the amino groups may be used either singly or as combined.

According to the above-mentioned constitution, the component (A2) can be a compound having three M-N bonds, in which each bond is chemically equivalent, and accordingly, the compound can have a stable structure and is easy to handle.

In addition, according to the constitution, the catalytic activity in the reaction system can be further enhanced. Consequently, the reaction time can be shortened more and the reaction temperature can be elevated more.

In the case where A is oxygen, examples of the component (A2) represented by the formula (1) include, though not specifically limited thereto, a rare earth alcoholate represented by the following formula (1a):

$$(RO)_3M \tag{1a, and}$$

a rare earth carboxylate represented by the following formula (1b):

$$(R\text{—}CO_2)_3M \tag{1b}.$$

Here, in the formulae (1a) and (1b), R may be the same or different, and represents an alkyl group having 1 to 10 carbon atoms.

Preferably, the component (A2) does not have a bond of rare earth element and carbon, and therefore, the compound represented by the formula (1a) or the compound represented by the formula (1b) is favorably used.

In the case where A is sulfur, examples of the component (A2) represented by the formula (1) include, though not specifically limited thereto, a rare earth alkyl thiolate represented by the following formula (1c):

$$(RS)_3M \quad (1c)$$

and a compound represented by the following formula (1d):

$$(R-CS_2)_3M \quad (1d)$$

Here, in the formulae (1c) and (1d), R may be the same or different, and represents an alkyl group having 1 to 10 carbon atoms.

Preferably, the component (A2) does not have a bond of rare earth element and carbon, and therefore, the compound represented by the formula (1c) or the compound represented by the formula (1d) is favorably used.

The component (B2) is a compound selected from the group consisting of a substituted or unsubstituted cyclopentadiene, a substituted or unsubstituted indene (indenyl group-having compound) and a substituted or unsubstituted fluorene.

One alone or two or more kinds of the components for the component (B2) may be used either singly or as combined.

Examples of the substituted cyclopentadiene include pentamethylcyclopentadiene, tetramethylcyclopentadiene, isopropylcyclopentadiene, trimethylsilyl-tetramethylcyclopentadiene, etc.

Examples of the substituted or unsubstituted indene include indene, 2-phenyl-1H-indene, 3-benzyl-1H-indene, 3-methyl-2-phenyl-1H-indene, 3-benzyl-2-phenyl-1H-indene, 1-benzyl-1H-indene, etc. In particular, from the viewpoint of reducing molecular weight distribution, 3-benzyl-1H-indene and 1-benzyl-1H-indene are preferred.

Examples of the substituted fluorene include trimethylsilylfluorene, isopropylfluorene, etc.

According to the above-mentioned constitution, the conjugated electrons that the cyclopentadiene skeleton-having compound can provide may be increased to further enhance the catalytic activity in the reaction system. Consequently, the reaction time can be shortened further, and the reaction temperature can be elevated more.

The organic metal compound (component (C2)) is a compound represented by a formula (2):

$$YR^4_a R^5_b R^6_c \quad (2)$$

wherein Y represents a metal element selected from the group consisting of elements of Groups 1, Group 2, Group 12 and Group 13 of the Periodic Table, $R^4$ and $R^5$ each represent a monovalent hydrocarbon group having 1 to 10 carbon atoms, or a hydrogen atom, $R^6$ represents a monovalent hydrocarbon group having 1 to 10 carbon atoms, and $R^4$, $R^5$ and $R^6$ may be the same as or different from each other, when Y is a metal element of Group 1, a is 1 and b and c are 0, when Y is a metal element of Group 2 or Group 12, a and b are 1 and c is 0, and when Y is a metal element of Group 13, a, b and c are 1.

Here, from the viewpoint of enhancing catalytic activity, preferably, at least one of $R^1$, $R^2$ and $R^3$ in the formula (2) differs from the others.

In detail, the component (C2) is preferably an organic aluminum compound represented by a formula (3):

$$AlR^7R^8R^9 \quad (3)$$

wherein $R^7$ and $R^8$ each represent a monovalent hydrocarbon group having 1 to 10 carbon atoms, or a hydrogen atom, $R^9$ represents a monovalent hydrocarbon group, and $R^7$, $R^8$ and $R^9$ may be the same or different.

Examples of the organic aluminum compound include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride; ethylaluminum dihydrides, n-propylaluminum dihydrides, isobutylaluminum dihydrides, etc. Triethylaluminum, triisobutylaluminum, diethylaluminum hydride, diisobutylaluminum hydride are preferred, and diisobutylaluminum hydride is more preferred.

One alone or two or more kinds of these organic aluminum compounds may be used either singly or as combined.

The aluminoxane compound (component (D2)) is a compound obtained by bringing an organic aluminum compound into contact with a condensing agent.

Using the component (D2), the catalytic activity in the polymerization reaction system can be enhanced more. Consequently, the reaction time can be shortened more and the reaction temperature can be elevated more.

Here, examples of the organic aluminum compound include a trialkylaluminum such as trimethylaluminum, triethylaluminum, triisobutylaluminum, etc., and a mixture thereof, etc. In particular, trimethylaluminum and a mixture of trimethylaluminum and tributylaluminum are preferred.

Examples of the condensing agent include water, etc.

Examples of the component (D2) include an aluminoxane represented by a formula (4):

$$-(Al(R^{10})O)_n- \quad (4)$$

wherein $R^{10}$ represents a monovalent hydrocarbon group having 1 to 10 carbon atoms, and a part of the hydrocarbon group may be substituted with a halogen and/or an alkoxy group; $R^{10}$ may be the same or different in the repeating units; and n is 5 or more.

The molecular structure of the aluminoxane may be linear or cyclic.

n is preferably 10 or more.

Examples of the hydrocarbon group for $R^{10}$ include a methyl group, an ethyl group, a propyl group, an isobutyl group, etc., and a methyl group is especially preferred. One alone or two or more kinds of the hydrocarbon groups may be used either singly or as combined. The hydrocarbon group for $R^{10}$ is preferably a combination of a methyl group and an isobutyl group.

The aluminoxane preferably has high solubility for aliphatic hydrocarbon groups and preferably has low solubility for aromatic hydrocarbons. For example, an aluminoxane commercially sold as a hexane solution is preferred.

Here, aliphatic hydrocarbons include hexane, cyclohexane, etc.

In particular, the component (D2) may be a modified aluminoxane represented by a formula (5):

$$-(Al(CH_3)_x(i\text{-}C_4H_9)_y O)_m- \quad (5)$$

wherein x+y is 1; m is 5 or more (hereinafter may be referred to as "TMAO"). Examples of TMAO include TMAO341, a product name by Tosoh Finechem Corporation.

The component (D2) may also be a modified aluminoxane represented by a formula (6):

$$-(Al(CH_3)_{0.7}(i\text{-}C_4H_9)_{0.3}O)_k- \quad (6)$$

wherein k is 5 or more (hereinafter may be referred to as "MMAO"). Examples of MMAO include MMAO-3A, a product name by Tosoh Finechem Corporation.

Further, the component (D2) may be especially a modified aluminoxane represented by a formula (7):

 (7)

wherein i is 5 or more (hereinafter may be referred to as "PMAO"). Examples of PMAO include TMAO-211, a product name by Tosoh Finechem Corporation.

The component (D2) is, from the viewpoint of enhancing the effect of increasing the catalytic activity, preferably MMAO or TMAO among the above-mentioned MMAO, TMAO and PMAO, and is, from the viewpoint of further enhancing the effect of increasing the catalytic activity, more preferably TMAO.

The halogen compound (component (E2)) is at least one compound selected from the group consisting of a halogen-containing compound of a Lewis acid (hereinafter may be referred to as "component (E2-1)"), a complex compound of a metal halide and a Lewis base (hereinafter may be referred to as "component (E2-2)"), and an active halogen-containing organic compound (hereinafter may be referred to as "component (E2-3)").

These compounds react with the component (A2), that is, a rare earth element-containing compound or a reaction product of a rare earth element-containing compound and a Lewis base having an M-N bond to form a cationic transition metal compound, a halogenated transition metal compound and/or a transition metal compound where the transition metal center is short in electrons.

Using the component (E2) may increase the cis-1,4-bond content in the resultant conjugated diene copolymer.

Examples of the component (E2-1) include a halogen-containing compound that contains an element of Group 3, Group 4, Group 5, Group 6, Group 8, Group 13, Group 14 or Group 15, etc., and in particular, an aluminum halide or an organic metal halide is preferred.

Examples of the halogen-containing compound of a Lewis acid include titanium tetrachloride, tungsten hexachloride, tri(pentafluorophenyl) borate, methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesqui-bromide, methylaluminum sesqui-chloride, ethylaluminum sesqui-bromide, ethylaluminum sesqui-chloride, aluminum tribromide, tri(pentafluorophenyl)aluminum, dibutyltin dichloride, tin tetrachloride, phosphorus trichloride, phosphorus pentachloride, antimony trichloride, antimony pentachloride, etc. In particular, ethylaluminum dichloride, ethylaluminum dibromide, diethylaluminum chloride, diethylaluminum bromide, ethylaluminum sesqui-chloride, ethylaluminum sesqui-bromide are preferred.

The halogen is preferably chlorine or bromine.

One alone or two or more kinds of the halogen-containing compounds of Lewis acids may be used either singly or as combined.

Examples of the metal halide to be used for the component (E2-2) include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper bromide, copper iodide, silver chloride, silver bromide, silver iodide, gold chloride, gold iodide, gold bromide, etc. Magnesium chloride, calcium chloride, barium chloride, zinc chloride, manganese chloride and copper chloride are preferred, and magnesium chloride, zinc chloride, manganese chloride and copper chloride are more preferred.

The Lewis base to be used for the component (E2-2) is preferably a phosphorus compound, a carbonyl compound, a nitrogen compound, an ether compound and an alcohol.

Examples of the compounds include tributyl phosphate, tri-2-ethylhexyl phosphate, triphenyl phosphate, tricresyl phosphate, triethyl phosphine, tributyl phosphine, triphenyl phosphine diethyl phosphinoethane, diphenylphosphinoethane, acetylacetone, benzoylacetone, propionylacetone, valerylacetone, ethylacetylacetone, methyl acetoacetate, ethyl acetoacetate, phenyl acetoacetate, dimethyl malonate, diethyl malonate, diphenyl malonate, acetic acid, octanoic acid, 2-ethylhexanoic acid, oleic acid, stearic acid, benzoic acid, naphthenic acid, Versatic acid, triethylamine, N,N-dimethylacetamide, tetrahydrofuran, diphenyl ether, 2-ethylhexyl alcohol, oleyl alcohol, stearyl alcohol, phenol, benzyl alcohol. 1-decanol, lauryl alcohol, etc. In particular, tri-2-ethylhexyl phosphate, tricresyl phosphate, acetylacetone, 2-ethylhexanoic acid, Versatic acid, 2-ethylhexyl alcohol, 1-decanol, and lauryl alcohol are preferred.

Regarding the molar number of the Lewis base, preferably, the base is reacted in a ratio of 0.01 to 30 mol, more preferably 0.5 to 10 mol relative to 1 mol of the metal halide. Using a reaction product with the Lewis base can reduce the metal to remain in the produced polymer.

Examples of the (E2-3) component include benzyl chloride, etc.

The ratio by mass of the components to constitute the fourth polymerization catalyst composition is described below.

The ratio by mol of the component (B2) (compound selected from the group consisting of a substituted or unsubstituted cyclopentadiene, a substituted or unsubstituted indene and a substituted or unsubstituted fluorene) to the component (A2) (rare earth element compound) is, from the viewpoint of sufficiently attaining catalytic activity, preferably more than 0, more preferably 0.5 or more, and even more preferably 1 or more, and is, from the viewpoint of suppressing catalytic activity reduction, preferably 3 or less, more preferably 2.5 or less, even more preferably 2.2 or less.

The ratio by mol of the component (C2) (organic metal compound) to the component (A2) is, from the viewpoint of improving the catalytic activity in the reaction system, preferably 1 or more, more preferably 5 or more, and is, from the viewpoint of suppressing catalytic activity reduction in the reaction system, preferably 50 or less, more preferably 30 or less, and is specifically, even more preferably about 10.

The ratio by mol of aluminum in the component (D2) (aluminoxane) to the rare earth element in the component (A2) is, from the viewpoint of improving the catalytic activity in the reaction system, preferably 10 or more, more preferably 100 or more, and is, from the viewpoint of suppressing catalytic activity reduction in the reaction system, preferably 1,000 or less, more preferably 800 or less.

The ratio by mol of the component (E2) (halogen compound) to the component (A2) is, from the viewpoint of enhancing catalytic activity, preferably 0 or more, more preferably 0.5 or more, even more preferably 1.0 or more, and is, from the viewpoint of maintaining the solubility of the component (E2) and preventing the catalytic activity from lowering, preferably 20 or less, more preferably 10 or less.

Accordingly, within the above range, the effect of increasing the cis-1,4-bond content in the conjugated diene polymer can be enhanced.

Preferably, the fourth polymerization catalyst composition does not contain an ionic compound composed of a non-coordinating anion (for example, tetravalent boron anion, etc.) and a cation (for example, carbonium cation, oxonium cation, ammonium cation, phosphonium cation, cycloheptatrienyl cation, transition metal-having ferrocenium cation, etc.). Here, the ionic compound has high solubility for aromatic hydrocarbons and has low solubility for hydrocarbons. Consequently, the polymerization catalyst composition not containing such an ionic compound can produce a conjugated diene polymer while further reducing environmental load and production cost.

"Not containing an ionic compound" means that the proportion of an ionic compound, if any, in the polymerization catalyst composition is less than 0.01% by mass.

<Coupling Step>

The coupling step is a step of modifying (by coupling) at least a part (for example, the terminal) of the polymer chain of the multicomponent copolymer obtained in the previous polymerization step.

In the coupling step, the coupling reaction is preferably carried out when the polymerization reaction has reached 100%.

The coupling agent to be used for the coupling reaction is not specifically limited, and may be appropriately selected depending on the intended purpose. Examples of the coupling agent include a tin-containing compound such as bis(maleic acid-1-octadecyl)dioctyltin(IV), etc.; an isocyanate compound such as 4,4'-diphenylmethane diisocyanate, etc.; and an alkoxysilane compound such as glycidylpropyltrimethoxysilane, etc. One alone or two or more kinds of these may be used either singly or as combined.

Among these, bis(maleic acid-1-octadecyl)dioctyltin(IV) is preferred from the viewpoint of reaction efficiency and low gel formation.

The coupling reaction increases number-average molecular weight (Mn).

<Washing Step>

The washing step is a step of washing the multicomponent copolymer obtained in the previous polymerization step. The medium to be used for washing is not specifically limited and may be appropriately selected depending on the intended purpose. For example, methanol, ethanol, 2-propanol or the like may be used, and in the case where a Lewis acid-derived catalyst is used as the polymerization catalyst, in particular, an acid (for example, hydrochloric acid, sulfuric acid, nitric acid) may be added to the solvent for use for washing. The amount of the acid to be added is preferably 15 mol % or less of the solvent. When the amount of the acid is more than the above, the acid may remain in the multicomponent copolymer to have some negative influence on kneading and reaction for vulcanization.

In the washing step, the amount of the residual catalyst to remain in the multicomponent copolymer can be favorably lowered.

(Rubber Composition)

The rubber composition of the present invention contains at least the multicomponent copolymer of the present invention and may optionally contain a filler, a crosslinking agent and any other rubber component, etc.

The other rubber component is not specifically limited, and may be appropriately selected depending on the intended purpose, and examples thereof include a polyisoprene, a butadiene rubber (BR), an acrylonitrile-butadiene rubber (NBR), a chloroprene rubber, an ethylene-propylene rubber (EPM), an ethylene-propylene-non-conjugated diene rubber (EPDM), a polysulfide rubber, a silicone rubber, a fluorine rubber, an urethane rubber, etc. One alone or two or more kinds of these may be used either singly or as combined.

The rubber composition may contain, if desired, a filler for the purpose of improving the reinforcing performance thereof. The amount of the filler to be added is not specifically limited and may be appropriately selected depending on the intended purpose. Preferably, the amount is 10 to 100 parts by mass relative to 100 parts by mass of the rubber component, more preferably 20 to 80 parts by mass, even more preferably 30 to 60 parts by mass. When the amount thereof is 10 parts by mass or more, the filler can exhibit the effect of enhancing reinforcing performance, and when 100 parts by mass or less, good workability can be maintained while evading significant reduction in the advantage of low hysteresis loss.

The filler includes, though not specifically limited thereto, carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, barium sulfate, etc. Among these, use of carbon black is preferred. One alone or two or more kinds of these may be used either singly or as combined.

The carbon black is not specifically limited and may be appropriately selected depending on the intended purpose, and examples thereof include FEF, GPF, SRF, HAF, N339, IISAF, ISAF, SAF, etc. One alone or two or more kinds of these may be used either singly or as combined.

The nitrogen adsorption specific surface area of the carbon black ($N_2SA$, measured according to JIS K 6217-2: 2001) is not specifically limited and may be appropriately selected depending on the intended purpose, and is preferably 20 to 100 $m^2/g$, more preferably 35 to 80 $m^2/g$. When the nitrogen adsorption specific surface area of the carbon black ($N_2SA$) is 20 $m^2/g$ or more, the resultant rubber composition may have improved durability and may secure sufficient resistance of cracking growth; and when 100 $m^2/g$ or less, good workability can be maintained while evading significant reduction in the advantage of low hysteresis loss.

If desired, a crosslinking agent may be used for the rubber composition. The crosslinking agent is not specifically limited, and may be appropriately selected depending on the intended purpose, and examples thereof include a sulfur-based crosslinking agent, an organic peroxide-based crosslinking agent, an inorganic crosslinking agent, a polyamine-based crosslinking agent, a resin-based crosslinking agent, a sulfur compound-based crosslinking agent, an oxime-nitrosamine-based crosslinking agent, etc. Among these, a sulfur-based crosslinking agent (vulcanizing agent) is preferred for the rubber composition for tires.

The content of the crosslinking agent is not specifically limited, and may be appropriately selected depending on the intended purpose. Preferably, the content is 0.1 to 20 parts by mass relative to 100 parts by mass of the rubber component. When the content of the crosslinking agent is 0.1 parts by mass or more, crosslinking can go on favorably; and when 20 parts by mass or less, crosslinking during kneading can be prevented and crosslinked products having good physical properties can be favorably obtained.

In the case where the vulcanizing agent is used, a vulcanization accelerator may be used additionally. The vulcanization accelerator includes a guanidine compound, an aldehyde-amine compound, an aldehyde-ammonia compound, a thiazole compound, a sulfenamide compound, a thiourea compound, a thiuram compound, a dithiocarbamate compound, a xanthate compound, etc. Further if desired, for the rubber composition of the present invention, any known components such as a softener, a vulcanization aid, a colorant, a flame retardant, a lubricant, a foaming agent, a plasticizer, a processing aid, an antioxidant, an antiaging agent, a scorching inhibitor, an UV inhibitor, an antistatic agent, a discoloration inhibitor and other ingredients may be used depending on the intended purpose thereof.

(Crosslinked Rubber Composition)

The rubber composition of the present invention may be crosslinked to give a crosslinked rubber composition. The crosslinking condition is not specifically limited and may be appropriately selected depending on the intended purpose. Preferably, the temperature is 120 to 200° C., and the heating time is 1 minute to 900 minutes. The crosslinked rubber composition uses a conjugated diene compound as one monomer for the rubber component, and therefore as compared with a polymer using a non-conjugated diene compound such as EPDM as one monomer, the crosslinking properties of the former are good and consequently the mechanical properties thereof are better.

(Tire)

The tire of the present invention is not specifically limited so far as it uses the rubber composition of the present invention, and may be appropriately selected depending on the intended purpose. The tire uses the rubber composition that contains the multicomponent copolymer of the present invention, and therefore can be produced with high workability and, in addition, the tire is excellent in fracture performance at high temperatures and has high weather resistance. The site of the tire in which the rubber composition of the present invention is to be used is not specifically limited, and may be appropriately selected depending on the intended purpose. For example, the rubber composition may be used in treads, base treads, side walls, side-reinforcing rubbers, bead fillers, etc. Among these, the rubber composition is advantageously used in side walls from the viewpoint of fracture performance and weather resistance.

As the method for producing the tire, any ordinary method is employable. For example, members generally used in tire production, such as a carcass layer, a belt layer, a tread layer and the like formed of at least one selected from the group consisting of an unvulcanized rubber composition and a cord are layered in order, on a drum for tire formation, and then the drum is removed to give a green tire. Next, the green tire is vulcanized under heat according to an ordinary method to produce a desired tire (for example, pneumatic tire).

(Use Other than Tire)

The rubber composition of the present invention can be used for vibration-proof rubber, seismic isolation rubbers, belts such as conveyor belts, as well as for rubber crawlers, various hoses and the like, in addition to use for tires.

EXAMPLES

The present invention is described in more detail with reference to Examples given below, but the present invention is not restricted at all by these Examples.

Synthesis Example 1: Tercopolymer A 100 g of a toluene solution containing 5 g (0.04 mol) of styrene was added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 0.93 mmol of diisobutylaluminum hydride, and 17 µmol of dimethylanilinium tetrakis(pentafluorophenyl)borate [Me$_2$NHPhB(C$_6$F$_5$)$_4$] manufactured by Kanto Chemical Co., Inc. were put into a glass container, and dissolved in 10 mL of toluene to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (0.3 MPa) at 80° C. for 25 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer A. The yield of the resultant copolymer A was 72 g.

Synthesis Example 2: Tercopolymer B 5 g (0.04 mol) of styrene and 100 g of cyclohexane were added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 1.2 mmol of diisobutylaluminum hydride, and 17 µmol of dimethylanilinium tetrakis(pentafluorophenyl)borate [Me$_2$NHPhB(C$_6$F$_5$)$_4$] were put into a glass container, and dissolved in 10 mL of cyclohexane to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (1.5 MPa) at 80° C. for 300 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer B. The yield of the resultant copolymer B was 126 g.

Synthesis Example 3: Tercopolymer C 5 g (0.04 mol) of styrene and 100 g of cyclohexane were added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 0.9 mmol of diisobutylaluminum hydride, and 17 µmol of dimethylanilinium tetrakis(pentafluorophenyl)borate [Me$_2$NHPhB(C$_6$F$_5$)$_4$] were put into a glass container, and dissolved in 10 mL of cyclohexane to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (1.5 MPa) at 80° C. for 200 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer C. The yield of the resultant copolymer C was 113 g.

Synthesis Example 4: Tercopolymer D 100 g of a toluene solution containing 5 g (0.04 mol) of styrene was added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 0.93 mmol of diisobutylaluminum hydride, and 17 µmol of dimethylanilinium tetrakis(pentafluorophenyl)borate [Me$_2$NHPhB(C$_6$F$_5$)$_4$] manufactured by Kanto Chemical Co., Inc. were put into a glass container, and dissolved in 10 mL of toluene to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (1.0 MPa) at 80° C. for 25 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer D. The yield of the resultant copolymer D was 71 g.

Synthesis Example 5: Tercopolymer E 20 g (0.19 mol) of styrene and 160 g of cyclohexane were added to a fully-dried 2-L stainless reactor. On the other hand, in a glove box in a nitrogen atmosphere, 83 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 1.8 mmol of diisobutylaluminum hydride, and 91 µmol of dimethylanilinium tetrakis(pentafluorophenyl)borate [Me$_2$NHPhB(C$_6$F$_5$)$_4$] were put into a glass container, and dissolved in 30 mL of cyclohexane to give a catalyst solution. Subsequently, the catalyst solution was taken out of the glove box, and the entire amount of the catalyst solution was added to the reactor, and then 650 g of a monomer solution containing 150 g (2.78 mol) of 1,3-butadiene was introduced thereinto, and polymerized under an ethylene pressure (1.5 MPa) at 80° C. for 300 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer E. The yield of the resultant copolymer E was 241 g.

Synthesis Example 6: Tercopolymer F 3 g (0.03 mol) of styrene and 100 g of cyclohexane were added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 0.9 mmol of diisobutylaluminum hydride, and 17 µmol of dimethylanilinium tetrakis(pentafluorophenyl)borate [Me$_2$NHPhB(C$_6$F$_5$)$_4$] were put into a glass container, and dissolved in 10 mL of cyclohexane to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (1.5 MPa) at 80° C. for 150 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer F. The yield of the resultant copolymer F was 81 g.

Synthesis Example 7: Tercopolymer G 3 g (0.03 mol) of styrene and 100 g of cyclohexane were added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 0.93 mmol of diisobutylaluminum hydride, and 17 µmol of dimethylanilinium tetrakis(pentafluorophenyl)borate [Me$_2$NHPhB(C$_6$F$_5$)$_4$] were put into a glass container, and dissolved in 10 mL of cyclohexane to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (0.3 MPa) at 80° C. for 20 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer G. The yield of the resultant copolymer G was 76 g.

Synthesis Example 8: Tercopolymer H 5 g (0.04 mol) of styrene and 150 g of cyclohexane were added to a fully-dried 2-L stainless reactor. On the other hand, in a glove box in a nitrogen atmosphere, 120 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 1.8 mmol of diisobutylaluminum hydride, and 132 µmol of dimethylanilinium tetrakis(pentafluorophenyl)borate [Me$_2$NHPhB(C$_6$F$_5$)$_4$] were put into a glass container, and dissolved in 80 mL of cyclohexane to give a catalyst solution. Subsequently, the catalyst solution was taken out of the glove box, and the entire amount of the catalyst solution was added to the reactor, and then 650 g of a monomer solution containing 40 g (0.74 mol) of isoprene was introduced thereinto, and polymerized under an ethylene pressure (1.5 MPa) at 80° C. for 480 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer H. The yield of the resultant copolymer H was 72 g.

Comparative Example 1: Tercopolymer a 100 g of a toluene solution containing 10 g (0.09 mol) of styrene was added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 0.93 mmol of diisobutylaluminum hydride, and 17 µmol of dimethylanilinium tetrakis(pentafluorophenyl)borate [Me$_2$NHPhB(C$_6$F$_5$)$_4$] manufactured by Kanto Chemical Co., Inc. were put into a glass container, and dissolved in 10 mL of toluene to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (0.3 MPa) at 80° C. for 20 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer a. The yield of the resultant copolymer a was 70 g.

Comparative Example 2: Tercopolymer b 8 g (0.07 mol) of styrene and 100 g of cyclohexane were added to a fully-dried 2-L stainless reactor. On the other hand, in a glove box in a nitrogen atmosphere, 15 µmol of 1,3-bis(t-butyldimethylsilyl)indenylgadolinium-bis(bis(dimethylsilyl)amide) [1,3-TBS$_2$C$_9$H$_5$Gd(N(SiHMe$_2$)$_2$)$_2$], 1.2 mmol of diisobutylaluminum hydride, and 17 µmol of dimethylanilinium tetrakis(pentafluorophenyl)borate [Me$_2$NHPhB(C$_6$F$_5$)$_4$] were put into a glass container, and dissolved in 10 mL of cyclohexane to give a catalyst solution. Subsequently, the catalyst solution was taken out of the glove box, and the entire amount of the catalyst solution was added to the reactor, and then 350 g of a monomer solution containing 75 g (1.38 mol) of 1,3-butadiene was introduced thereinto, and polymerized under an ethylene pressure (1.5 MPa) at 80° C. for 350 minutes. After the polymerization, 2 mL of a 2-propanol solution of 5 mass % 2,2'-methylene-bis(4-ethyl-6-t-butylphenol) (NS-5) was added to terminate the reaction, and further using a large amount of 2-propanol, the copolymer was separated, dried in vacuum at 60° C. to give a copolymer b. The yield of the resultant copolymer b was 93 g.

(Confirmation of Multicomponent Copolymer)

The copolymer obtained as above was confirmed to be in monodispersion through measurement of gel permeation chromatography-refractive index curve (GPC-RI curve), and through $^1$H-NMR spectrometry and $^{13}$C-NMR spectrometry, the aromatic ring skeleton derived from an aromatic vinyl compound was confirmed to thereby confirm whether or not the copolymer is a tercopolymer.

As one example, the $^1$H-NMR spectrum, the $^{13}$C-NMR spectrum, and the GPC-RI curve of the multicomponent copolymer E are shown in FIG. 1, FIG. 2 and FIG. 3, respectively.

The $^1$H-NMR spectrum and the $^{13}$C-NMR spectrum were obtained through measurement using tetrachloroethane as a solvent at 100° C. In FIG. 1 and FIG. 2, the horizontal axis indicates a chemical shift value (ppm) and the vertical axis indicates a peak intensity (integrated value).

The GPC-RI curve was obtained through measurement using trichlorobenzene as a solvent. In FIG. 3, the horizontal axis indicates an elution time (min) and the vertical axis indicates a refractive index (mV).

As in the above, the copolymers A to G and a to c were identified to be tercopolymers.

(Confirmation of Main Chain Structure of Copolymer)

In the $^{13}$C-NMR spectrum of the copolymer E, the presence or absence of the peak derived from a three-membered alicyclic structure and the peak derived from a 5-membered alicyclic structure was confirmed.

As one example, an enlarged view in the part of 10 ppm to 50 ppm of the $^{13}$C-NMR spectrum of the copolymer E is shown in FIG. 4. The horizontal axis indicates a chemical shift value (ppm), and the vertical axis indicates a peak intensity (integrated value). This $^{13}$C-NMR spectrum has neither a peak derived from the carbon to form a three-membered alicyclic structure (about 10 to 22 ppm) nor a peak derived from the carbon to form a 5-membered alicyclic structure (about 23 to 24 ppm, Makromol. Chem., 1991, Vol. 192, pp. 2591-2601). Accordingly, it is confirmed that the main chain of the copolymer has an acyclic structure alone.

(Identification of Copolymer)

The copolymer was analyzed and evaluated in point of the weight-average molecular weight (Mw), the molecular weight distribution (Mw/Mn), the microstructure and the melting point (Tm) thereof, according to the methods mentioned below. The results are shown in Table 1.

(1) Weight-Average Molecular Weight (Mw) and Molecular Weight Distribution (Mw/Mn)

Based on monodispersed polystyrene, the polystyrene-equivalent weight-average molecular weight (Mw) and the molecular weight distribution (Mw/Mn) of the copolymers A to G and a to c were measured through gel permeation chromatography [GPC: HLC-8220GPC/HT manufactured by Tosoh Corporation, column: GMHHR-H(S)HT×2, manufactured by Tosoh Corporation, detector: differential refractive index detector (RI)]. The measurement temperature was 140° C.

(2) Microstructure

The microstructures of the copolymers A to G and a and b were analyzed by an integral ratio in $^1$H-NMR spectrometry (1,2-vinyl bond content) and $^{13}$C-NMR spectrometry (content ratio of cis-1,4 bond and trans-1,4 bond). Table 1 shows the cis-1,4-bond content (%), the trans-1,4-bond content (%) and the 1,2-vinyl bond content (%) in the whole conjugated diene compound-derived unit, and the content of the conjugated diene unit (mol %), the content of the non-conjugated olefin unit (mol %) and the content of the aromatic vinyl unit (mol %).

The aromatic vinyl unit content, the non-conjugated olefin unit content and the conjugated diene unit content were determined from the integral ratio of the styrene-derived aromatic hydrogen (7.5 to 6.4 ppm), the 1,4-butadiene bond-derived olefin hydrogen (5.5 to 4.7 ppm) or the 1,4-isoprene bond-derived olefin hydrogen (5.2 to 4.5 ppm) in the copolymer, and each aliphatic hydrogen (1.4 to 2.4 ppm). The calculated values are shown in Table 1.

(3) Melting Point (Tm)

The melting point of the copolymers A to H and a and b was measured, using a differential scanning calorimeter (DSC, "DSCQ2000" manufactured by TA Instruments Japan) and according to JIS K 7121-1987. The copolymers having a lower melting point have lower crystallinity. When the melting point thereof could not be detected, the copolymer is amorphous. Copolymers not having a melting point are shown as "no" in Table 1. Regarding copolymers having plural melting points, the highest melting point thereof was taken as an evaluation target and the value thereof is shown in Table 1.

TABLE 1

| | Copolymer | | | | | | | | | |
|---|---|---|---|---|---|---|---|---|---|---|
| | Example | | | | | | | | Comparative Example | |
| | A | B | C | D | E | F | G | H | a | b |
| Weight-Average Molecular Weight Mw [×10³] | 381 | 411 | 335 | 319 | 348 | 393 | 492 | 365 | 424 | 376 |
| Molecular Weight Distribution Mw/Mn | 2.31 | 3.43 | 2.56 | 2.16 | 4.97 | 3.14 | 4.28 | 3.46 | 3.26 | 2.96 |
| Cis-1,4-bond content (%) | 92.4 | 89.4 | 91.6 | 94.2 | 89.9 | 91.4 | 89.7 | 88.3 | 95.1 | 90.6 |
| Trans-1,4-bond content (%) | 5.8 | 8.3 | 7.1 | 4.7 | 6.4 | 5.8 | 6.7 | 8.3 | 2.5 | 7.3 |
| 1,2-Vinyl bond content (%) | 1.8 | 2.3 | 1.3 | 1.1 | 3.7 | 2.8 | 3.6 | 3.4 | 2.4 | 2.1 |
| Melting Point Tm (° C.) | 123 | 119 | 115 | 108 | 121 | 105 | 124 | 125 | no | 126 |
| Aromatic Vinyl Unit Content (mol %) | 3 | 4 | 3 | 4 | 2 | 1 | 1 | 2.5 | 7 | 6 |
| Non-conjugated Olefin Unit Content (mol %) | 8 | 47 | 32 | 16 | 46 | 25 | 6 | 62 | 2 | 54 |
| Conjugated Diene Unit Content (mol %) | 89 | 49 | 65 | 80 | 52 | 74 | 93 | 35.5 | 91 | 40 |

INDUSTRIAL APPLICABILITY

According to the present invention, there can be provided a multicomponent copolymer that contributes toward improving crack resistance, weather resistance and low heat generation of rubber compositions and rubber products such as tires, etc. In addition, according to the present invention, there can be provided a rubber composition and a rubber product such as tires and the like that can be produced with high workability and are excellent in crack resistance, weather resistance and low heat generation.

The invention claimed is:

1. A multicomponent copolymer comprising a conjugated diene unit, a non-conjugated olefin unit and an aromatic vinyl unit, wherein:
   the main chain is formed of an acyclic structure alone, and the content of the aromatic vinyl unit is 0.1 mol % or more and 5 mol % or less of the whole multicomponent copolymer, and, wherein:
   the multicomponent copolymer has at least one melting point and the highest melting point of the at least one melting point is 105° C. or higher.

2. The multicomponent copolymer according to claim 1, wherein the cis-1,4-bond content in the whole conjugated diene unit is 50% or more.

3. The multicomponent copolymer according to claim 1, wherein the content of the non-conjugated olefin unit is 50 mol % or less of the whole multicomponent copolymer.

4. The multicomponent copolymer according to claim 1, wherein the content of the conjugated diene unit is 45 mol % or more of the whole multicomponent copolymer.

5. The multicomponent copolymer according to claim 1, wherein the content of the conjugated diene unit is 80 mol % or less of the whole multicomponent copolymer.

6. The multicomponent copolymer according to claim 1, wherein the non-conjugated olefin unit is an ethylene unit alone.

7. The multicomponent copolymer according to claim 1, wherein the aromatic vinyl unit contains a styrene unit.

8. The multicomponent copolymer according to claim 1, wherein the conjugated diene unit contains at least one selected from the group consisting of a 1,3-butadiene unit and an isoprene unit.

9. The multicomponent copolymer according to claim 1, which is a tercopolymer composed of only a 1,3-butadiene unit, an ethylene unit and a styrene unit.

10. A rubber composition comprising the multicomponent copolymer of claim 1.

11. A crosslinked rubber composition comprising crosslinking the rubber composition of claim 10.

12. A rubber product comprising the crosslinked rubber composition of claim 11.

13. A tire comprising the crosslinked rubber composition of claim 11.

14. The multicomponent copolymer according to claim 2, wherein the content of the non-conjugated olefin unit is 50 mol % or less of the whole multicomponent copolymer.

15. The multicomponent copolymer according to claim 2, wherein the content of the conjugated diene unit is 45 mol % or more of the whole multicomponent copolymer.

16. The multicomponent copolymer according to claim 2, wherein the content of the conjugated diene unit is 80 mol % or less of the whole multicomponent copolymer.

* * * * *